United States Patent
Kim et al.

(10) Patent No.: US 8,651,772 B2
(45) Date of Patent: Feb. 18, 2014

(54) ROTARY APPARATUS FOR USE WITH A GASIFIER SYSTEM AND METHODS OF USING THE SAME

(75) Inventors: Jyung-Hoon Kim, Kingwood, TX (US); John Saunders Stevenson, Yorba Linda, CA (US); Steven Craig Russell, Houston, TX (US); Aaron John Avagliano, Houston, TX (US)

(73) Assignee: General Electric Company, Schenectady, NY (US)

( * ) Notice: Subject to any disclaimer, the term of this patent is extended or adjusted under 35 U.S.C. 154(b) by 1250 days.

(21) Appl. No.: 11/961,222

(22) Filed: Dec. 20, 2007

(65) Prior Publication Data
US 2009/0158664 A1    Jun. 25, 2009

(51) Int. Cl.
*B65G 53/08* (2006.01)

(52) U.S. Cl.
USPC ................ 406/63; 406/52; 406/181; 406/183

(58) Field of Classification Search
USPC ...................... 406/52, 63, 181, 183
See application file for complete search history.

(56) References Cited

U.S. PATENT DOCUMENTS

| | | | | |
|---|---|---|---|---|
| 2,459,180 A | * | 1/1949 | Richter | 406/53 |
| 2,914,223 A | * | 11/1959 | Richter | 406/109 |
| 3,041,232 A | * | 6/1962 | Richter et al. | 162/17 |
| 3,516,714 A | | 6/1970 | Roerig et al. | |
| 3,910,428 A | | 10/1975 | Peterson, II | |
| 3,982,789 A | * | 9/1976 | Funk | 406/105 |
| 3,993,227 A | * | 11/1976 | Oettinger | 222/368 |
| 4,017,270 A | | 4/1977 | Funk et al. | |
| 4,033,811 A | * | 7/1977 | Gloersen | 162/17 |
| 4,047,901 A | | 9/1977 | Baron et al. | |
| 4,078,704 A | | 3/1978 | Pinkel | |
| 4,148,405 A | | 4/1979 | Hathaway | |
| 4,187,043 A | * | 2/1980 | Kindersley | 406/105 |
| 4,372,338 A | * | 2/1983 | Efferson | 137/240 |
| 4,372,711 A | * | 2/1983 | Richter et al. | 406/63 |
| 4,415,296 A | * | 11/1983 | Funk | 406/19 |

(Continued)

FOREIGN PATENT DOCUMENTS

| | | |
|---|---|---|
| DE | 2936389 A1 | 4/1981 |
| GB | 1495831 | 12/1977 |
| WO | 0143862 A1 | 6/2001 |

OTHER PUBLICATIONS

International Search Report, PCT/US2008/083352, dated Aug. 5, 2009, pp. 5.

(Continued)

*Primary Examiner* — Joseph Dillon, Jr.
(74) *Attorney, Agent, or Firm* — Armstrong Teasdale LLP

(57) ABSTRACT

A method for transporting a solid particulate within a gasifier system is provided. The method includes discharging solid particulate through an inlet into an opening defined within a rotor, wherein the inlet and the solid particulate are at a first pressure. The method further includes rotating the rotor such that at least one end of the opening is aligned in flow communication with a duct at a second pressure that is different from the first pressure. The solid particulate is discharged from the rotor opening through an outlet such that the solid particulate is at the second pressure, and the rotor is rotated such that at least one end of the rotor opening is aligned in flow communication with a pressure source that is at approximately the first pressure, and such that the opening is at the first pressure.

11 Claims, 7 Drawing Sheets

(56) References Cited

U.S. PATENT DOCUMENTS

| | | | |
|---|---|---|---|
| 4,430,029 A * | 2/1984 | Richter et al. | 406/63 |
| 4,462,740 A | 7/1984 | Cytra | |
| 4,508,473 A | 4/1985 | Richter et al. | |
| 4,516,674 A | 5/1985 | Firth | |
| 4,838,898 A | 6/1989 | Mifflin et al. | |
| 4,940,385 A | 7/1990 | Gurth | |
| 4,988,239 A | 1/1991 | Firth | |
| 5,236,285 A * | 8/1993 | Prough | 406/52 |
| 5,236,286 A * | 8/1993 | Prough | 406/52 |
| 5,355,993 A | 10/1994 | Hay | |
| 5,356,280 A | 10/1994 | Ponzielli | |
| 5,381,933 A | 1/1995 | Beirle et al. | |
| 5,443,162 A * | 8/1995 | Sherman | 209/274 |
| 5,476,572 A * | 12/1995 | Prough | 162/246 |
| 5,497,873 A | 3/1996 | Hay | |
| 5,551,553 A | 9/1996 | Hay | |
| 5,622,598 A * | 4/1997 | Prough | 162/52 |
| 5,635,025 A * | 6/1997 | Bilodeau | 162/17 |
| 5,657,704 A | 8/1997 | Schueler | |
| 5,736,006 A * | 4/1998 | Prough | 162/52 |
| 5,795,438 A * | 8/1998 | Stromberg et al. | 162/52 |
| 6,129,246 A | 10/2000 | Metzler | |
| 6,213,289 B1 | 4/2001 | Hay et al. | |
| 6,247,877 B1 * | 6/2001 | Rost | 406/182 |
| 6,305,884 B1 * | 10/2001 | Lewis et al. | 406/182 |
| 6,437,255 B1 | 8/2002 | Ludescher | |
| 6,468,006 B1 * | 10/2002 | Prough | 406/63 |
| 6,641,336 B1 * | 11/2003 | Bolles | 406/63 |
| 6,706,199 B2 | 3/2004 | Winter et al. | |
| 6,832,887 B2 | 12/2004 | Baer et al. | |
| 6,986,625 B2 * | 1/2006 | Witheridge | 406/85 |
| 7,438,507 B2 * | 10/2008 | Scharger | 406/128 |
| 2002/0043023 A1 | 4/2002 | Davis, Jr. | |

OTHER PUBLICATIONS

D. Mills et al., "Analysis of Performance of Dilute Phase", Proceedings of the Technical Program; International Powder and Bulk Solids Handling and Processing; Atlanta, Georgia, May 24-26, 1983, pp. 107-124.

D. Mills et al., "Analysis of Dense Phase Pneumatic Conveying of Cement in Vertical Pipelines", Powder and Bulk Solids Handling and Processing, International Powder Institute, Nov. 2005, vol. 9th, pp. 125-147.

D. Geldart and S.J. Ling, "Dense Phase Conveying of Fine Coal at High Total Pressures", University of Bradford, Bradford, BD7 1DP (U.K.), Powder Technology, 62, May 8, 1990, pp. 243-252.

* cited by examiner

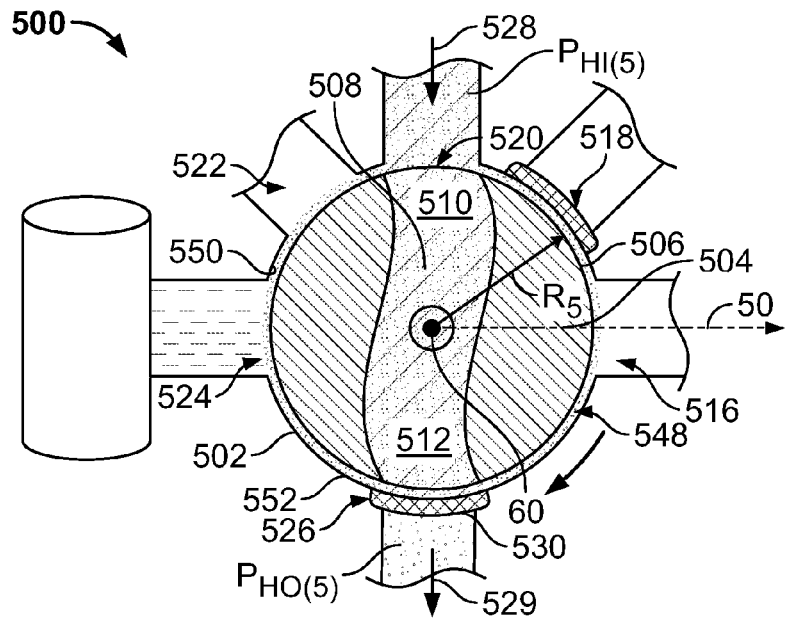
FIG. 5A
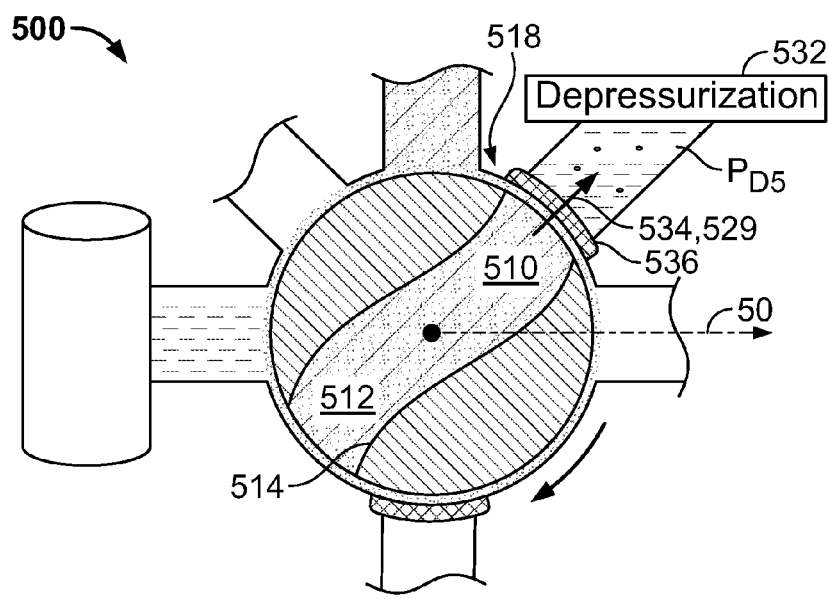
FIG. 5B

ROTARY APPARATUS FOR USE WITH A GASIFIER SYSTEM AND METHODS OF USING THE SAME

BACKGROUND OF THE INVENTION

This invention relates generally to a rotary apparatus for use with a gasifier system, and, more specifically, to a rotary apparatus for use in transporting a solid particulate within a gasifier system.

Some known coal gasification systems use an entrained bed, non-catalytic, partial oxidation Texaco Gasification Process (TGP) in which carbonaceous feedstock reacts at elevated temperatures and pressures to produce synthetic gas that includes carbon monoxide and hydrogen. In at least some known gasification systems, carbonaceous feed, such as, high-rank bituminous coal, is first made into a slurry and is then pumped to a specially designed injector mounted at the top of the refractory-lined gasifier. As such, difficulties involved into feeding dry feedstock to the gasifier at high pressures are avoided. However, known slurry water may represent a thermal liability because the vaporization and heating of water increases oxygen consumption within the gasifier. Generally, however, at least some known gasification processes can tolerate the amount of water added to make bituminous coal slurries because bituminous coals naturally have higher energy contents and lower water contents than low-rank coals, such as sub-bituminous coals.

The natural moisture content of low-rank coals is generally comparable to the amount of water added to bituminous coal to make bituminous coal slurries. As such, slurry feeding low-rank coals to a gasifier may cause a thermal liability that is substantially greater than the thermal liability of bituminous coal slurries such that feeding low rank coals as slurries to the gasifier may be impractical. To overcome such problems, at least some known low-rank coals may be dried and then made into a slurry, such that the low-rank coal slurry fed to the gasifier has a reduced amount of water, as compared to low-rank coal slurries made with un-pre-dried low-rank coal. However, known moisture removal methods for low-rank coal may create additional difficulties if drying does not accompany changes in coal internal structures. As such, feeding dry low-lank coal is usually preferable to feeding a low-rank coal slurry or dried low-rank coal slurry.

Some known gasification systems that dry-feed coal into a gasifier use lock hoppers to supply feedstock to the gasifier. However, at least some known lock hoppers have difficulty supplying dry coal feedstock to entrained flow slagging gasifiers at pressures higher than approximately 30-40 bars (435-580 psi). However, some known entrained flow slagging gasifiers require a feedstock pressure higher than approximately 30-40 bars. To achieve higher pressures, at least some known lock hoppers use valves, fluidizing systems, and/or compressed fluidizing gases. However, in addition to the difficulties and complexities associated with such equipment, the gas consumption to fluidize ground coal in a pressurized lock hopper increases as the pressure increases. Furthermore, at least some known pressurized lock hoppers include a steep cone angle to facilitate the flow of ground coal. However, such a cone angle generally significantly increases the height of lock hopper. Other known gasification systems use a pump, rather than a lock hopper, to dry feed coal to the gasifier, however, the flow rates of such pumps are generally less than the coal feed rate corresponding to the gasifier capacity.

One known gasification system uses a pocketed wheel to transport liquid and coal particles to a fixed-bed, Lurgi-type gasifier at high pressures. However, such an apparatus is not configured to dry-feed feedstock to an entrained-flow type gasifier, which generally requires a higher feed pressure than a fixed-bed gasifier.

Some known entrained flow gasifiers discharge solids, or slag, from the bottom of the gasification process equipment. Such solids generally include the inorganic and metal components in the feedstock, for example, ash in coal, and a small amount of unconverted carbon. The solids are discharged from the bottom of known gasifiers intermittently through a lock hopper system. Generally, to remove slag through some known lock hopper systems, slag is first cooled directly or indirectly within the gasification process, and then enters the lock hopper through an automatic valve, and a lock hopper dump cycle is controlled by valve sequencing. However, such valve systems add complexity to the gasification system.

BRIEF DESCRIPTION OF THE INVENTION

In one aspect, a method for transporting a solid particulate within a gasifier system is provided. The method includes discharging solid particulate through an inlet into an opening defined within a rotor, wherein the inlet and the solid particulate are at a first pressure. The method further includes rotating the rotor such that at least one end of the opening is aligned in flow communication with an outlet at a second pressure that is different from the first pressure. The solid particulate is discharged from the rotor opening through an outlet such that the solid particulate is at the second pressure, and the rotor is rotated such that at least one end of the rotor opening is aligned in flow communication with a pressure source that is at approximately the first pressure, and such that the opening is at the first pressure.

In another aspect, a rotary apparatus is provided. The rotary apparatus includes a housing and a rotor coupled within the housing. At least one first pressure port is defined in the housing. The at least one first pressure port is at a first pressure. At least one second pressure port is defined in the housing. The at least one second pressure port at a second pressure that is different than the first pressure. At least one channel extends through the rotor. The at least one channel is oriented substantially perpendicular to an axis of rotation of the rotor, and the at least one channel is configured to selectively align with the at least one first pressure port and the at least one second pressure port as the rotor rotates within the housing.

In a further aspect, a rotary apparatus is provided. The rotary apparatus includes a housing and a rotor coupled within the housing. At least one first pressure port is defined in the housing. The first pressure port is at a first pressure. The rotary apparatus also includes at least one second pressure port that is defined in the housing. The second pressure port is at a second pressure that is different than the first pressure. The rotary apparatus also includes at least one pocket defined within an outer surface of the rotor. The at least one pocket is configured to selectively align with the first pressure port and the second pressure port as the rotor rotates within the housing.

In another aspect, a system for supplying a feedstock to a gasifier system is provided. The system includes a feedstock supply at a first pressure and a gasifier system at a second pressure that is different than the first pressure. A rotary apparatus is coupled in flow communication with the feedstock supply and the gasifier system. The rotary apparatus is configured to transport feedstock from the feedstock supply at the first pressure to the gasifier system at the second pressure.

In a further aspect, a system for removing solid particulate from a gasifier cooler is provided. The system includes a gasifier cooler including solid particulate therein. The gasifier cooler is at a first pressure. The system also includes a solid particulate collection device at a second pressure that is different than the first pressure, and a rotary apparatus coupled in flow communication with the gasifier cooler and the solid particulate collection device. The rotary apparatus is configured to transport the solid particulate from the gasifier cooler at the first pressure to the solid particulate collection device at the second pressure.

BRIEF DESCRIPTION OF THE DRAWINGS

FIG. 5A is a schematic cross-sectional view of an alternative embodiment of a rotary apparatus in a first orientation.

FIG. 5B is a schematic cross-sectional view of the rotary apparatus shown in FIG. 5A in a second orientation.

DETAILED DESCRIPTION OF THE INVENTION

Figure 1:
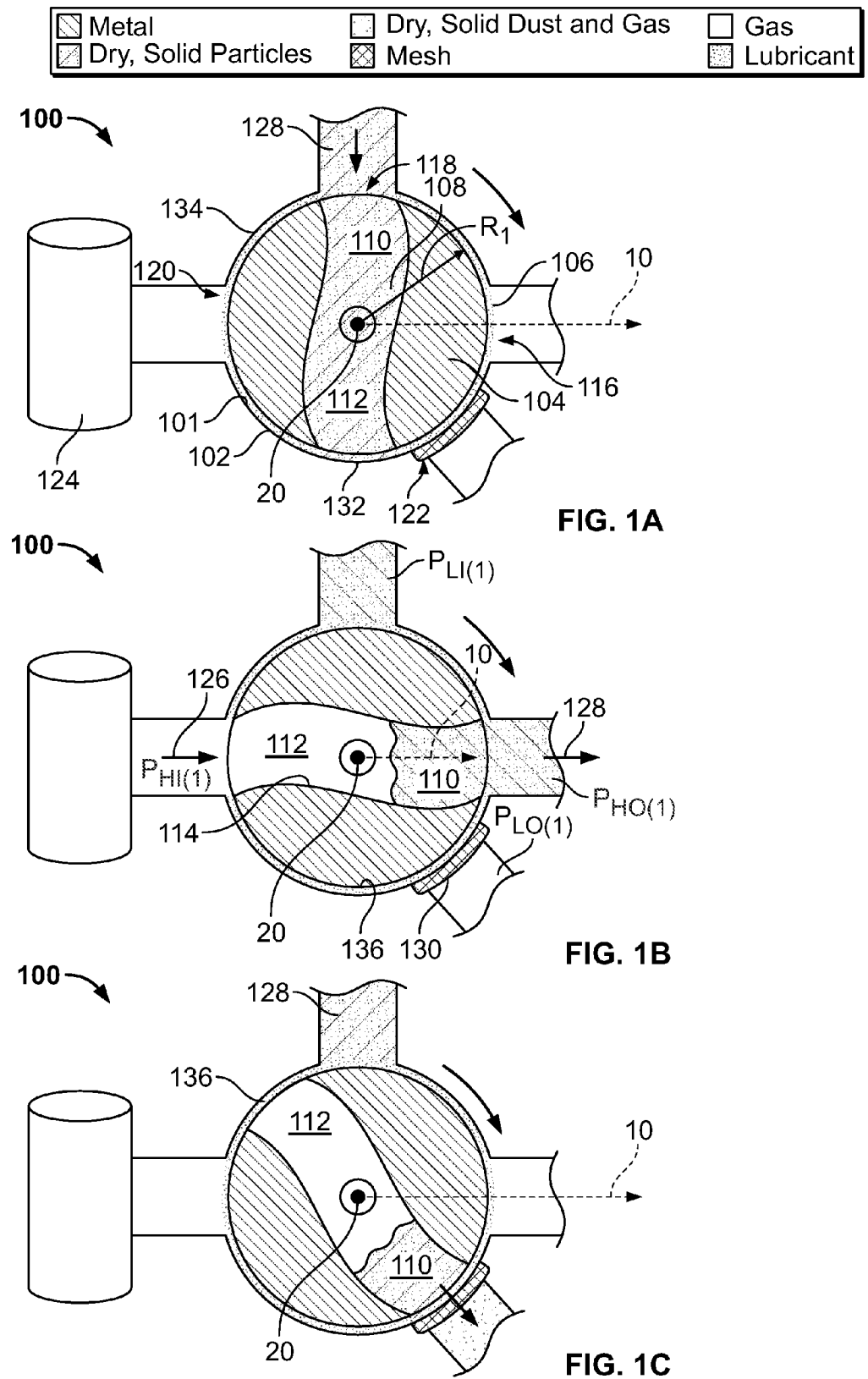
FIG. 1A is a schematic cross-sectional view of an exemplary embodiment of a rotary apparatus in a first orientation.
FIG. 1B is a schematic cross-sectional view of the rotary apparatus shown in FIG. 1A in a second orientation.
FIG. 1C is a schematic cross-sectional view of the rotary apparatus shown in FIG. 1A in a third orientation.

FIG. 1A is a schematic cross-sectional view of an exemplary rotary apparatus 100 at a first orientation, for example, but not limited to, a 90° orientation (also referred to herein as "orientation 1A"). FIG. 1B is a schematic cross-sectional view of rotary apparatus 100 in a second orientation, for example, but not limited to, a 0° orientation (also referred to herein as "orientation 1B"). FIG. 1C is a schematic cross-sectional view of rotary apparatus 100 in a third orientation, for example, but not limited to, a 315° orientation (also referred to herein as "orientation 1C"). Although orientations of rotary apparatus 100 are described as being at 90°, 0° and/or 315° from a reference direction 10, it should be understood that the values for the orientation degrees are exemplary only, are only illustrated for clarity of description, and are in no way limiting. For example, the components of rotary apparatus 100 may be oriented at any degree from reference direction 10 that enables rotary apparatus 100 to function as described herein. In the exemplary embodiment, reference direction 10 is substantially aligned in a radial direction with respect to an axial centerline 20 of apparatus 100. Furthermore, all angles referred to below are measured counter-clockwise from reference direction 10 unless otherwise stated.

Figure 3:
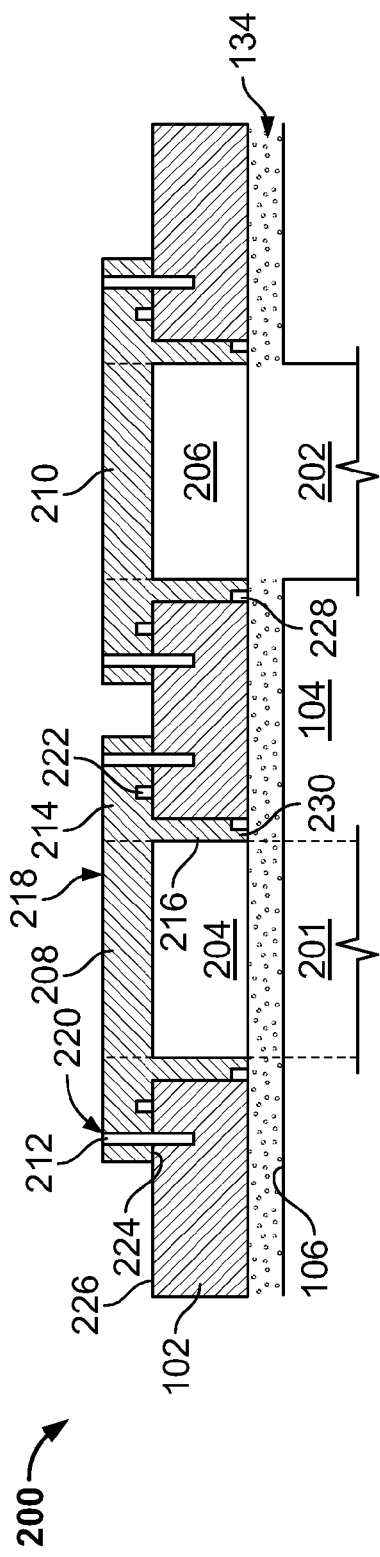
FIG. 3 is plan view of the housing shown in FIG. 2.

In the exemplary embodiment, rotary apparatus 100 includes a housing 102 and a rotor 104. More specifically, housing 102 and rotor 104 are concentrically aligned and have a common axial centerline 20. Further, in the exemplary embodiment, rotor 104 has a radius $R_1$ measured from centerline 20 to an outer surface 106 of rotor 104. Rotor 104, in the exemplary embodiment, includes at least one channel 108 (also referred to herein as a "open through pocket") that extends through rotor 104 and intersects centerline 20. Moreover, channel 108 is oriented substantially perpendicular to centerline 20. In the exemplary embodiment, channel 108 has a first end 110 and a second end 112 that are circumferentially-spaced along rotor outer surface 106 by, for example, approximately 180° from each other. Further, although in the exemplary embodiment channel 108 is shown with a curved-ribbon cross-section, channel 108 may have any suitable cross-sectional shape that enables rotary apparatus 100 to function as described herein. In one embodiment, channel 108 has a cross-sectional shape that facilitates reducing areas, such as corners, in which solid particles may accumulate and be retained within channel 108. Additionally, in the exemplary embodiment, an inner surface 114 of channel 108 is polished, plastic coated, and/or otherwise treated to facilitate reducing friction along inner surface 114. Although only one channel 108 is described herein, rotor 104 may include a plurality of channels 108 (as shown in FIG. 3) that may each be rotationally offset from adjacent channels 108, by for example, an eighth of a rotation.

In the exemplary embodiment, housing 102 includes a plurality of ports 116, 118, 120, and 122. More specifically, in the exemplary embodiment, housing 102 includes a high-pressure outlet port 116, a low-pressure inlet port 118, a high-pressure inlet port 120, and a low-pressure outlet port 122. In the exemplary embodiment, high-pressure outlet port 116 is oriented at an angle of, for example, approximately 0°, low-pressure inlet port 118 is oriented at an angle of, for example, approximately 90°, high-pressure inlet port 120 is oriented at an angle of, for example, approximately 180°, and low-pressure outlet port 122 is oriented at an angle of, for example, approximately 315°. Alternatively, ports 116, 118, 120, and/or 122 are at different orientations than those described above, but are spaced in the same circumferential order about housing 102. More specifically, in the exemplary embodiment, high-pressure outlet port 116 is oriented to oppose high-pressure inlet port 120, and low-pressure outlet port 122 is oriented to be between high-pressure outlet port 116 and a bottom 132 of rotary apparatus 100.

In an alternative embodiment, low-pressure outlet port 122 is oriented at angle of, for example, approximately 180° from its position about housing 102, as illustrated and described in the exemplary embodiment. For example, low-pressure outlet port 122 is oriented at an angle of, but is not limited to being at angle of, approximately 135° from reference direction 10 (shown in FIGS. 1A-1C). More specifically, in the alternative embodiment, low-pressure outlet port 122 is oriented circumferentially between high-pressure inlet port 120 and low-pressure inlet port 118.

In the exemplary embodiment, high-pressure inlet port 120 is coupled to a high-pressure source 124 that supplies, for example, but is not limited to supplying, high-pressure gas 126, into rotor channel 108 during operation. High-pressure gas 126 may be, for example, nitrogen gas ($N_{2(g)}$) at a pressure $P_{HI(1)}$, which is approximately equal to, for example, about 800 psi. Furthermore, in the exemplary embodiment, high-pressure outlet port 116 is coupled to a gasifier system, such as, for example, gasifer system 408 (shown in FIG. 4), and is at a pressure $P_{HO(1)}$, which is approximately equal to, for example, about 750 psi.

Figure 4:
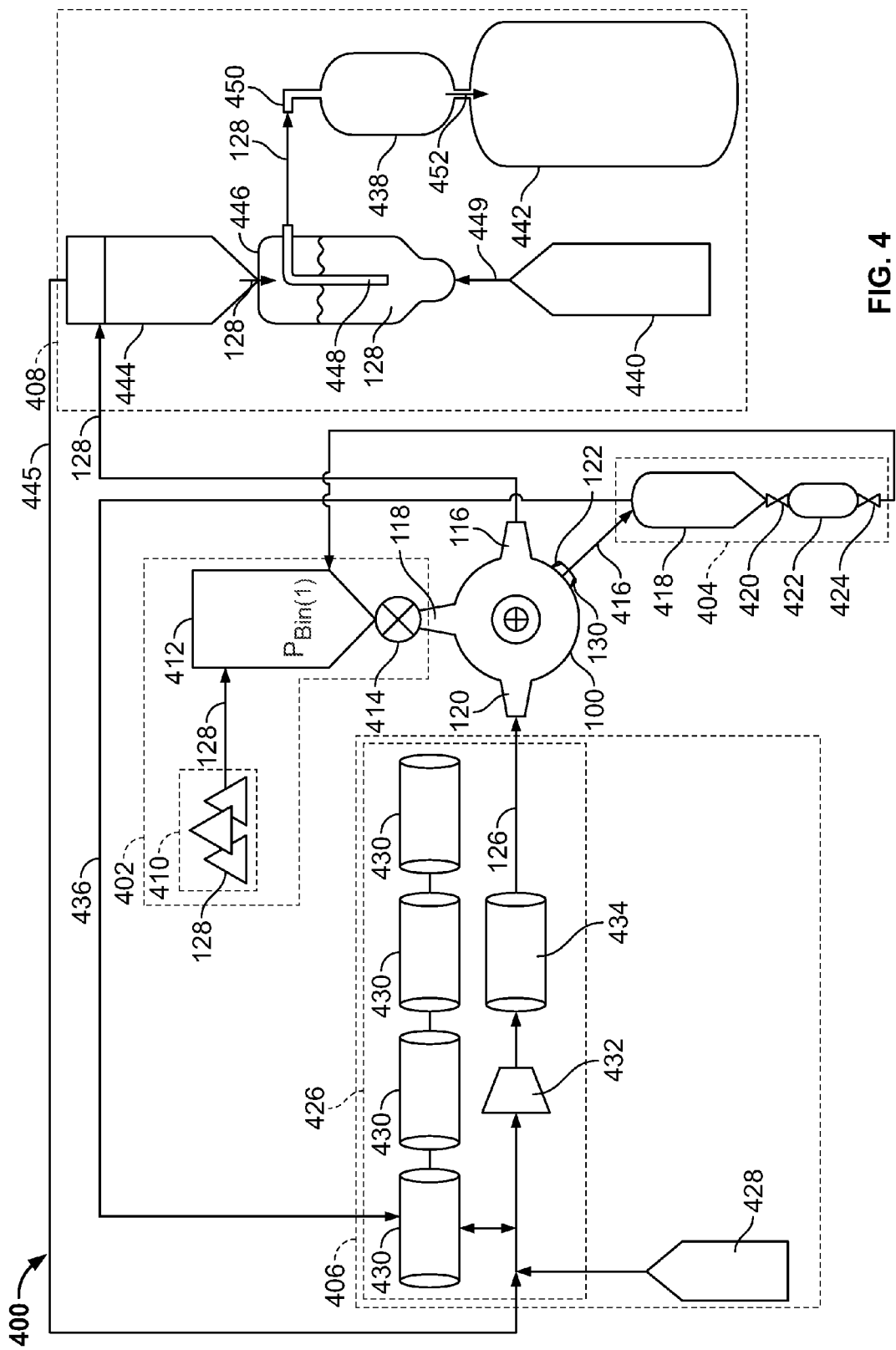
FIG. 4 is a schematic view of an exemplary system in which the rotary apparatus shown in FIG. 1A may be used.

In the exemplary embodiment, low-pressure inlet port 118 is coupled to a feedstock source, such as, for example, feedstock source 402 (shown in FIG. 4). As such, in the exemplary embodiment, low-pressure inlet port 118 includes feedstock 128 from the feedstock source at a pressure $P_{LI(1)}$, which is equal to, for example, approximately atmospheric pressure. Feedstock 128 may include particles of solid fuel, such as, for example, coal, petroleum coke, wastes, biomasses, and/or any other suitable gasifier feedstock, either wet or dry, in lump and/or ground form. In the exemplary embodiment, feedstock 128 is a free-flowing particulate. Furthermore, in the exemplary embodiment, low-pressure outlet port 122 is coupled to a low-pressure source (not shown), such as, for example, the atmosphere, a vacuum, and/or any other suitable low-pressure source that enables rotary apparatus 100 to function as described herein, such that low-pressure outlet port 122 has a pressure $P_{LO(1)}$, that is less than high-pressure outlet pressure $P_{HO(1)}$. Furthermore, in the exemplary embodiment, low-pressure outlet port 122 includes a filter device 130, such as, for example, a screen, a wire mesh, a plate (not shown) with holes, slots, and/or openings, and/or any other suitable filter device.

In the exemplary embodiment, filter device 130 is a part of and/or closely coupled to low-pressure outlet port 122, and includes isolation and cleaning means to facilitate isolation and cleaning substantially without interfering with the reduction in pressure in channel 108 during operation of rotary apparatus 100. In another embodiment, filter device 130 does not include isolation and/or cleaning capabilities. In the exemplary embodiment, isolation and cleaning means may be, for example, but not limited to being, a dual parallel filter arrangement (not shown) including isolation and vent valves. The dual parallel filter arrangement may include a device for using a back-flushing medium, and/or a device for recovering the particulate released from filter device 130 by such back-flushing and/or cleaning.

In an alternative embodiment, rotary apparatus 100 does not include filter device 130. In another alternative embodiment, filter device 130 is not a part of and/or closely coupled to rotary apparatus 100, but, rather, filter device 130 is located downstream of low-pressure outlet port 122. For example, filter device 130 may be located between rotary apparatus 100 and dust filter 404 (shown in FIG. 4). In one embodiment, filter device 130 includes openings larger than a feed particle size. In still another embodiment, low-pressure outlet port 122 is replaced by two or more low-pressure outlet ports (not shown) that can be operated independently to facilitate the operation of rotary apparatus 100, such as, but not limited to, depressurization, isolation, cleaning, and/or back-flushing of rotary apparatus 100, filter device 130, and/or any other associated filter devices (not shown).

In the exemplary embodiment, rotary apparatus 100 also includes a lubricant 134 between housing 102 and rotor 104. More specifically, lubricant 134 is applied to both rotor outer surface 106 and to an inner surface 101 of housing 102. Lubricant 134 may be, for example, but is not limited to being, a solid lubricant, such as, graphite, molybdenum sulfide, boron nitride, Polytetrafluoroethylene (PTFE), and/or any other suitable lubricant that enables rotary apparatus 100 to function as described herein. Further, lubricant 134 may be applied to rotor 104 and/or housing 102 by, for example, spraying, painting, and/or any suitable application technique.

Figure 2:
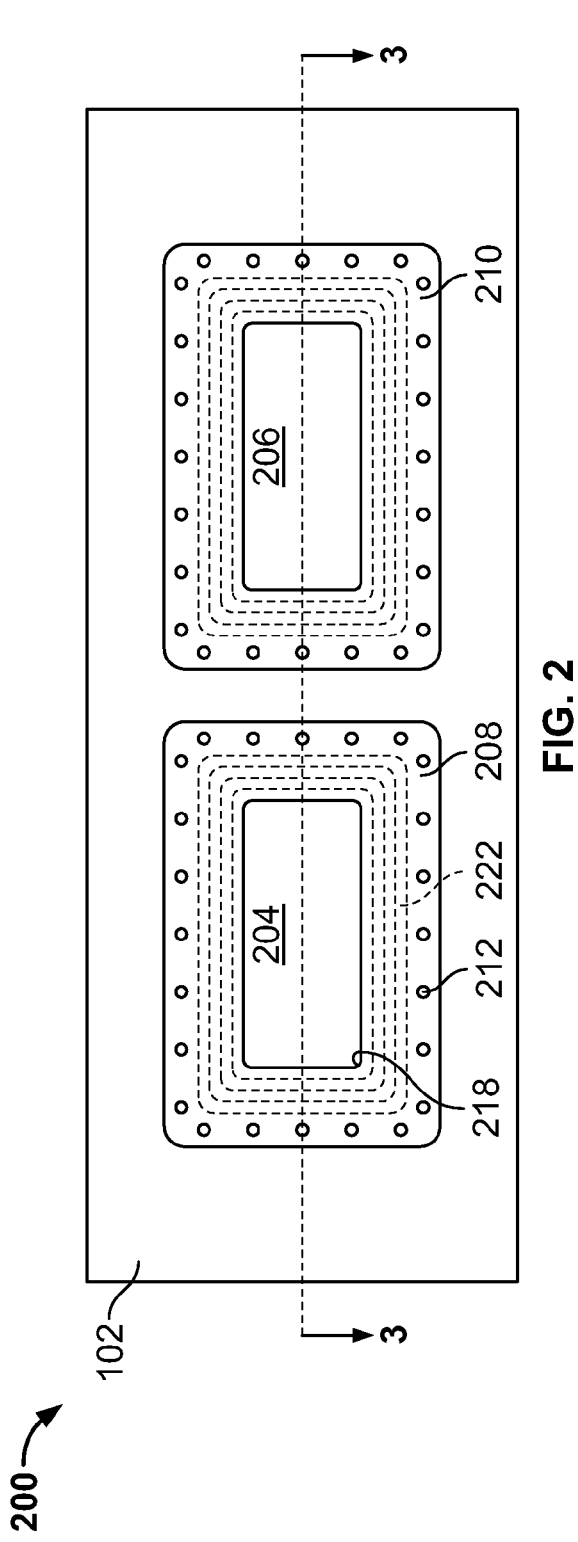
FIG. 2 is a side elevation view of a portion of an exemplary housing that may be used with the rotary apparatus shown in FIG. 1A.

An example of a configuration for ports 116, 118, 120, and/or 122, and more specifically, high-pressure ports 116 and 120, is shown in FIGS. 2 and 3. FIG. 2 is a side elevation view of a portion 200 of housing 102. FIG. 3 is plan view of housing portion 200. More specifically, in the exemplary embodiment, rotor 104 includes at least two channels 201 and 202, and housing 102 includes respective ports 204 and 206. Channels 201 and/or 202 may be configured substantially similarly to channel 108, and ports 204 and/or 206 may be configured substantially similar to any of ports 116, 118, 120, and/or 122. In the exemplary embodiment, ports 204 and 206 are substantially similar to high-pressure ports 116 and/or 120. Furthermore, in the exemplary embodiment, each port 204 and 206 includes a respective sealing insert 208 and 210. Sealing inserts 208 and 210 may be coupled to respective ports 204 and 206 using, for example, but not limited to, fasteners 212. For clarity of description, sealing insert 208 will be described in detail, but it will be understood that sealing insert 210 is substantially similar to sealing insert 208. In the exemplary embodiment, sealing insert 208 includes an outer plate portion 214, an inner insert portion 216, and an opening 218 that extends through outer plate portion 214 and inner insert portion 216.

In the exemplary embodiment, outer plate portion 214 and inner insert portion 216 are unitarily formed together. Alternatively, outer plate portion 214 may be coupled to a separate inner insert portion 216. In the exemplary embodiment, outer plate portion 214 includes a plurality of apertures 220 that are sized to receive fasteners 212, and portion 214 also includes a housing seal 222. More specifically, housing seal 222 is coupled within an inner surface 224 of outer plate portion 214 such that housing seal 222 is adjacent to an outer surface 226 of housing 102. Similarly, in the exemplary embodiment, inner insert portion 216 includes a rotor seal 228 that is coupled within an inner surface 230 of inner insert portion 216. As such, in the exemplary embodiment, rotor seal 228 is adjacent to rotor outer surface 106. Seal 222 and/or 228 may be any suitable type or seal, such as, for example, a brush seal, a ring seal, a pad seal and/or any other suitable seal, any of which may be formed from natural and/or synthetic material. Seals 222 and/or 228 may be fixed, self-regulating, hydraulically actuated, and/or any other suitable adjustable seal that enables apparatus 100 to function as described herein. Alternatively, housing 102 includes any other suitable ports and/or port sealing configuration that enables rotary apparatus 100 to function as described herein.

In operation, and referring again to FIGS. 1A, 1B, and 1C, rotor 104 rotates clockwise about centerline 20 within housing 102 to continuously transport feedstock 128 from the feedstock source to the gasifier system. More specifically, when channel first end 110 is generally aligned with low-pressure inlet port 118, as shown in FIG. 1A, feedstock 128 at low-pressure inlet pressure $P_{LI(1)}$ is loaded into channel 108 by, for example, gravity, such that channel 108 is substantially filled with feedstock 128. As rotor 104 rotates clockwise, channel first end 110 rotates from being generally aligned with low-pressure inlet port 118 to being generally aligned with high-pressure outlet port 116, and channel second end 112 rotates to being generally aligned with high-pressure inlet port 120, as shown in FIG. 1B. When rotor 104 is at orientation 1B, low-pressure inlet port 118 is substantially sealed by rotor outer surface 106, and high-pressure gas 126 at pressure $P_{HI(1)}$ is supplied to channel 108 such that feedstock 128 is pressurized from pressure $P_{LI(1)}$ to pressure $P_{HO(1)}$. As such, feedstock 128 at pressure $P_{HO(1)}$ is forced into the gasifier system by high-pressure gas 126.

As rotor 104 continues to rotate within housing 102, channel first end 110 rotates from being generally aligned with port 116 to being generally aligned with low-pressure outlet port 122, as shown in FIG. 1C. When channel 108 is at orientation 1C, the low-pressure source depressurizes channel 108 from pressure $P_{HO(1)}$ to pressure $P_{LO(1)}$. As such, any particles of feedstock 128 are pulled against and/or through filter device 130. More specifically, particles that pass through filter device 130 are collected in, for example, a duster filter, such as, for example, dust filter 404 (shown in FIG. 4), and particles that cannot pass through filter device 130 are retained in channel 108 for transport to the gasifier system during a subsequent rotation and/or are retained within filter device 130 to be subsequently removed from filter device 130, for example, when portions (not shown) of filter device 130 are isolated for cleaning and/or back-flushing. As rotor 104 continues to rotate, channel second end 112 is aligned generally with low-pressure inlet port 118 such that feedstock 128 is continuously supplied to the gasifier system, as described above. During rotor 104 rotation, lubricant 134 reduces frictional forces between rotor 104 and housing 102 and also substantially seals a gap 136 between rotor 104 and housing 102. Furthermore, in the exemplary embodiment, seals 222 and/or 228 also reduce pressure leaks between rotor 104 and housing 102.

In an alternative embodiment, radius $R_1$ of rotor 104 reduces uniformly along an axial length (not shown) of rotor 104 from a larger radius on one end (not shown) to a smaller radius on the other end (not shown). Accordingly, inner surface 101 of housing 102 is correspondingly tapered to form a uniform gap 136 between rotor 104 and housing 102, when rotor 104 centered axially within housing 102. Furthermore, in another embodiment, apparatus 100 includes an adjustment mechanism (not shown) to enable the adjustment of the relative axial position of rotor 104 within housing 102, wherein the adjustment mechanism may be operable during operation of rotary apparatus 100 such that gap 136 may be adjusted.

FIG. 4 is a schematic view of an exemplary system 400 in which rotary apparatus 100 may be used. System 400 may be used to gasify feedstock 128, as described in more detail herein. In the exemplary embodiment, system 400 includes rotary apparatus 100, feedstock source 402, dust filter 404, high-pressure source 406, and gasifier system 408.

In the exemplary embodiment, feedstock source 402 includes feedstock storage 410, a feedstock bin 412, and a rotary valve 414. More specifically, feedstock storage 410 is coupled to feedstock bin 412. Feedstock bin 412 includes feedstock therein, such as, for example feedstock 128, which, in the exemplary embodiment, is dry, ground sub-bituminous coal. In one embodiment, feedstock 128 is coal, and more specifically, is a low-rank coal. Feedstock 128 within feedstock storage 410 may be in lump form, ground form, and/or any other form that enables system 400 to function as described herein. In the exemplary embodiment, feedstock 128 within feedstock bin 412 is at a pressure $P_{bin(1)}$ that is approximately equal to atmospheric pressure such that pressure $P_{bin(1)}$ is approximately equal to pressure $P_{LI(1)}$. Alternatively, pressure $P_{bin(1)}$ may be at a pressure other than atmospheric pressure and/or pressure $P_{LI(1)}$. Furthermore, in the exemplary embodiment, feedstock source 402 is coupled to rotary apparatus 100 at low-pressure inlet port 118 such that feedstock 128 is supplied by feedstock source 402 to rotary apparatus 100. More specifically, in the exemplary embodiment, feedstock bin 412 is coupled to rotary apparatus 100 via rotary valve 414. Moreover, in the exemplary embodiment, rotary valve 414 controls a flow of feedstock 128 from feedstock bin 412 to rotary apparatus 100 without adversely affecting the pressure of feedstock 128. In another embodiment, rotary valve 414 is any valve and/or apparatus that facilitates ensuring a consistent flow of solids through rotary apparatus 100.

In the exemplary embodiment, dust filter 404 is coupled to rotary apparatus low-pressure outlet port 122 for collecting a dust mixture 416, such as, feedstock dust and/or transport gas, discharged from rotary apparatus 100 through filter device 130. Dust filter 404 includes, in the exemplary embodiment, a filtering device 418, a first valve 420, a collection bin 422, and a second valve 424. In the exemplary embodiment, dust mixture 416 enters dust filter filtering device 418 from rotary apparatus 100 at pressure $P_{LO(1)}$ and flows from filtering device 418 through first valve 420 to collection bin 422. Dust mixture 416 may be discharged from collection bin 422, through valve 424, into, for example, feedstock bin 412.

In the exemplary embodiment, high-pressure source 406 includes a compressor skid 426 and a low-pressure gas source 428. More specifically, in the exemplary embodiment, low-pressure gas source 428 includes low-pressure $N_{2(g)}$ from an Air Separation Unit (ASU) (not shown). Alternatively, low-pressure gas source 428 may include low-pressure gas other than $N_{2(g)}$ from the ASU. Moreover, in the exemplary embodiment, compressor skid 426 includes a plurality of low-pressure gas drums 430, a compressor 432, and a high-pressure gas drum 434. More specifically, in the exemplary embodiment, low-pressure gas source 428 is coupled to low-pressure gas drums 430 and compressor 432, low-pressure gas drums 430 are also coupled to compressor 432, and compressor 432 is coupled to high-pressure gas drum 434. High-pressure gas drum 434, in the exemplary embodiment, is coupled to rotary apparatus high-pressure inlet port 120 to supply high-pressure gas 126 to rotary apparatus 100 at pressure $P_{HI(1)}$. Further, in the exemplary embodiment, low-pressure gas 436 may be vented from dust filter 404 to at least one low-pressure gas drum 430. Additionally, in the exemplary embodiment, compressor skid 426 is configured to be a plant wide system. Although in the exemplary embodiment high-pressure source 406 is configured as described above, high-pressure source 406 may have any configuration that enables rotary apparatus 100 and/or system 400 to function as described herein.

Gasifier system 408, in the exemplary embodiment, includes a gasifier 438, a conveying gas source 440, and a syngas cooler 442, a gas cyclone 444, and a gasifier feed vessel 446. More specifically, in the exemplary embodiment, gasifier 438 is an entrained flow gasifier. In the exemplary embodiment, gas cyclone 444 is coupled to rotary apparatus high-pressure outlet port 116. As such, cyclone 444 and/or gasifier system 408 is supplied with feedstock 128 from rotary apparatus 100 at pressure $P_{HO(1)}$. Although only one cyclone 444 is described, gasifier system 408 may include any number of gas cyclones 444 or a multi-stage cyclone (not shown). Gas cyclone 444 is coupled to high-pressure source 406 to vent carrier gas 445 from cyclone 444 to compressor 432.

Gas cyclone 444 is coupled to a gasifier feed vessel 446 for retention of feedstock 128 after separation from carrier gas 445. A feed tube 448 extends through feed vessel 446 to facilitate discharging feedstock 128 from vessel 446. More specifically, feed tube 448 extends into feedstock 128 retained within vessel 446. Conveying gas source 440 is coupled to feed vessel 446 and is configured to inject a conveying gas 449 into feed tube 448. In the exemplary embodiment, conveying gas 449 supplied from conveying gas source 440 to feed vessel 446 and/or feed tube 448, may be, for example, sour carbon dioxide, sour gas, acid gas, and/or any other gas that enables gasifier system 408 and system 400 to function as described herein.

In the exemplary embodiment, feed tube 448 is coupled in flow communication with a gasifier injector 450. Gasifier injector 450 is coupled in flow communication with gasifier 438 and is configured to inject feedstock 128 into gasifier 438. Syngas cooler 442 is coupled in flow communication with gasifier 438 such that syngas cooler 442 receives syngas 452 produced in gasifier 438. Syngas cooler 442 may be connected to any suitable component for using and/or storing produced syngas 452.

Referring to FIGS. 1A-1C and FIG. 4, during operation of system 400, in the exemplary embodiment, feedstock 128, at pressure $P_{LI(1)}$, is supplied through feedstock bin 412 and rotary valve 414, into low-pressure inlet port 118. Channel 108 is substantially filled when rotor 104 is at orientation 1A. Moreover, in the exemplary embodiment, low-pressure gas (not shown) flows from low-pressure gas source 428, through compressor 432, and into high-pressure gas drum 434 for discharge, at pressure $P_{HI(1)}$, into rotary apparatus channel 108 when rotor 104 is at orientation 1B. Moreover, in the exemplary embodiment, when rotor 104 is at orientation 1B, feedstock 128, at pressure $P_{HO(1)}$, is discharged from rotary apparatus channel 108, as described herein, through rotary apparatus high-pressure outlet port 116, and into gas cyclone 444 for separation from carrier gas 445. More specifically, gas cyclone 444 separates high-pressure carrier gas 445, such as, for example, high-pressure $N_{2(g)}$, from feedstock 128 and vents carrier gas 445 to compressor 432 for use within system 400. Feedstock 128, substantially without carrier gas 445, is discharged from cyclone 444 into feed vessel 446 for retention therein.

Conveying gas 449 is injected into feed vessel 446 from conveying gas source 440. Injected conveying gas 449 forces feedstock 128 into feed tube 448 for discharge from feed vessel 446. Feedstock 128 injected from feed vessel 446 enters a gasifier injector 450 for injection of feedstock 128 into gasifier 438. Once feedstock 128 enters gasifier 438, syngas 452 is produced using feedstock 128, conveying gas 449, and/or any other suitable materials that enable syngas 452 to be produced. The produced syngas 452 is discharged from gasifier 438 into syngas cooler 442 for further processing.

In the exemplary embodiment, when rotor 104 rotates to orientation 1C, dust 416 is discharged from channel 108, at pressure $P_{LO(1)}$, through filter device 130, and into dust filter 404. Channel 108 is then depressurized from pressure $P_{HO(1)}$ to pressure $P_{LO(1)}$, and system 400 continues to operate as described herein with rotor 104 rotating from orientation 1C to orientation 1A.

Figure 5C:
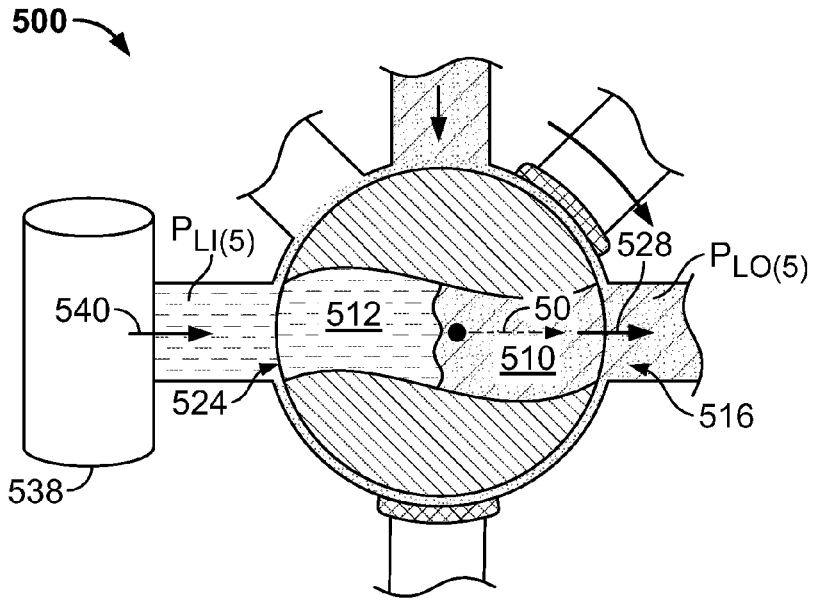
FIG. 5C is a schematic cross-sectional view of the rotary apparatus shown in FIG. 5A in a third orientation.
Figure 5D:
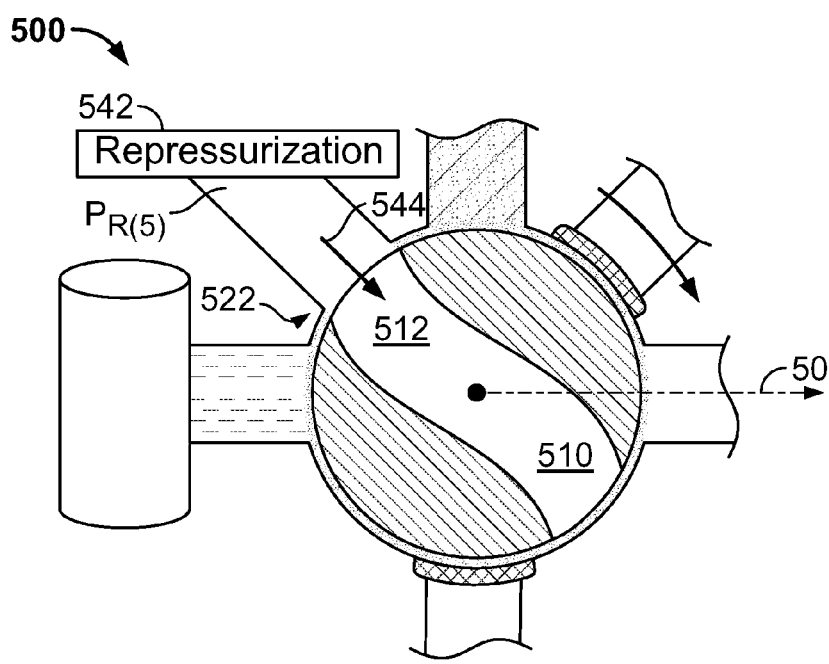
FIG. 5D is a schematic cross-sectional view of the rotary apparatus shown in FIG. 5A in a fourth orientation.

FIG. 5A is a schematic cross-sectional view of an alternative embodiment of a rotary apparatus 500 in a first orientation, for example, but not limited to, a 90° orientation (also referred to herein as "orientation 5A"). FIG. 5B is a schematic cross-sectional view of rotary apparatus 500 in a second orientation, for example, but not limited to, a 45° orientation (also referred to herein as "orientation 5B"). FIG. 5C is a schematic cross-sectional view of rotary apparatus 500 in a third orientation, for example, but not limited to, a 0° orientation (also referred to herein as "orientation 5C"). FIG. 5D is a schematic cross-sectional view of rotary apparatus 500 in a fourth orientation, for example, but not limited to, a 315° orientation (also referred to herein as "orientation 5D"). Although orientations of rotary apparatus 500 are described as being at 90°, 45°, 0° and/or 315° from a reference direction 50, it should be understood that the values for the orientation degrees are exemplary only, are only illustrated for clarity of description, and are in no way limiting. For example, the components of rotary apparatus 500 may be oriented at any degree from reference direction 50 that enables rotary apparatus 500 to function as described herein. Furthermore, all angles referred to below are measured counter-clockwise from reference direction 50 unless otherwise stated.

In the exemplary embodiment, rotary apparatus 500 includes a housing 502 and a rotor 504. More specifically, housing 502 and rotor 504 are concentrically aligned and have a common axial centerline 60. Further, in the exemplary embodiment, rotor 504 has a radius $R_5$ measured from centerline 60 to an outer surface 506 of rotor 504. Rotor 504, in the exemplary embodiment, includes at least one channel 508 (also referred to herein as a "open through pocket") that extends through rotor 504 and intersects centerline 60. Moreover, channel 508 is oriented substantially perpendicular to centerline 60. As such, in the exemplary embodiment, channel 508 has a first end 510 and a second end 512 that are circumferentially-spaced along rotor outer surface 506 by, for example, approximately 180° from each other. Further, although in the exemplary embodiment channel 508 is shown with a curved-ribbon cross-section, channel 508 may have any suitable cross-sectional shape that enables rotary apparatus 500 to function as described herein. In one embodiment, channel 508 has a cross-sectional shape that facilitates reducing areas, such as corners, in which solid particles may accumulate and be retained within channel 508. Additionally, in the exemplary embodiment, an inner surface 514 of channel 508 is polished, plastic coated, and/or otherwise treated to facilitate reducing friction along inner surface 514. Although only one channel 508 is described herein, rotor 504 may include a plurality of channels 508 that may each be rotationally offset from adjacent channels 508, by for example, an eighth of a rotation.

In the exemplary embodiment, housing 502 includes a plurality of ports 516, 518, 520, 522, 524, and 526. More specifically, in the exemplary embodiment, housing 502 includes a low-pressure outlet port 516, a depressurization port 518, a high-pressure inlet port 520, a repressurization port 522, a low-pressure inlet port 524, and a high-pressure outlet port 526. In the exemplary embodiment, low-pressure outlet port 516 is oriented at an angle of, for example, approximate 0°, depressurization port 518 is oriented at an angle of, for example, approximately 45°, high-pressure inlet port 520 is oriented at an angle of, for example, approximately 90°, repressurization port 522 is oriented at an angle of, for example, approximately 135°, low-pressure inlet port 524 is oriented at an angle of, for example, approximately 180°, and high-pressure outlet port 526 is oriented at an angle of, for example, approximately 270°. Alternatively, ports 516, 518, 520, 522, 524, and/or 526 are at different orientations than those described above, but are spaced in the same circumferential order about housing 502. Housing 502 may include a port sealing configuration that is substantially similar to the sealing configuration shown in FIGS. 2 and 3 and described above.

In the exemplary embodiment, high-pressure inlet port 520 is coupled to a syngas cooler, such as, for example syngas cooler 602 (shown in FIG. 6), and/or a gasifier, for example, the quench chamber of a gasifier. The high-pressure inlet port 520 receives, for example, slag, such as, slag 528 discharged from the syngas cooler and/or the gasifier. In the exemplary embodiment, "slag" includes solid particles formed during the gasification process, such as, for example, particles of inorganic and metallic components of feedstock, such as, for example, feedstock 128 (shown in FIG. 1), ash-in-coal, unconverted carbon, and/or glass-encapsulated metal oxides. "Slag" also includes, in the exemplary embodiment, water used to quench syngas and/or slag particulates and/or may include gases trapped in slag. In the exemplary embodiment, slag 528, at a pressure $P_{HI(5)}$, is received within rotor channel 508, when rotor channel first end 510 is substantially aligned with high-pressure inlet port 520. In the exemplary embodiment, pressure $P_{HI(5)}$ is, for example, approximately equal to 650 psi.

In the exemplary embodiment, high-pressure outlet port 526 includes a coarse filter device 530, such as, for example, a screen, a wire mesh, a plate (not shown) with holes, slots, and/or openings, and/or any other suitable filter device, such that a portion of slag, such as fine slag particles 529, exits rotary apparatus 500 and another portion of slag 528, such as coarse slag, remains in rotary apparatus 500 as rotor 504 rotates. More specifically, in the exemplary embodiment, slag 528 received within channel 508 through high-pressure inlet port 520, and fine slag particles 529 are discharged from channel 508 and passed through high-pressure outlet port 526 while coarse particles of slag 528 are retained within channel 508 until first end 510 substantially aligns with low-pressure outlet port 516, as described in more detail herein. As described above, high-pressure outlet port 526 and high-pressure inlet port 520 are circumferentially-spaced within housing 502 such the ports 526 and 520 substantially oppose each other. As such, in the exemplary embodiment, when channel first end 510 is substantially aligned with high-pressure inlet port 520, channel second end 512 is substantially aligned with high-pressure outlet port 526, such that slag 528 enters high-pressure inlet port 520, flows into channel 508, and fine slag particles 529 and/or water exit housing 502 after passing through high-pressure outlet port 526. In the exemplary embodiment, fine slag 529 exits high-pressure outlet port 526 at a pressure $P_{HO(5)}$ and coarse particles of slag 528 are retained in channel 508 at pressure $P_{HO(5)}$, wherein pressure $P_{HO(5)}$ is approximately equal to pressure $P_{HI(5)}$, for example, a pressure slightly lower than pressure $P_{HI(5)}$. Alternatively, pressure $P_{HO(5)}$ is at any other pressure that enables rotary apparatus 500 to function as described herein. In the exemplary embodiment, coarse filter device 530 is cleaned periodically by flushing filter device 530 with pressurized water jets (not shown) coupled about high-pressure outlet port 526.

In the exemplary embodiment, filter devices 518 and/or 530 are a part of and/or closely coupled to depressurization port 518 and/or high-pressure outlet port 526, respectively. Filter devices 518 and/or 530 include isolation and cleaning means to facilitate isolation and cleaning substantially without interfering with the reduction in pressure in channel 508 during operation of rotary apparatus 500. In another embodiment, filter devices 518 and/or 530 do not include isolation and/or cleaning capabilities. In the exemplary embodiment, isolation and cleaning means may be, for example, but not limited to being, a dual parallel filter arrangement (not shown) including isolation and vent valves. The dual parallel filter arrangement may include a device for using a back-flushing medium, and/or a device for recovering the particulate released from filter devices 518 and/or 530 by such back-flushing and/or cleaning.

In the exemplary embodiment, depressurization port 518 is coupled to a depressurization source 532, such as, for example, a vent line 610 (shown in FIG. 6) such that liquid 534, for example, water, and fine slag particles 529 exit rotary apparatus 500 through depressurization port 518. More specifically, depressurization port 518 is at a pressure $P_{D(5)}$ wherein pressure $P_{D(5)}$ is less than pressure $P_{HI(5)}$. In the exemplary embodiment, pressure $P_{D(5)}$ is approximately equal to atmospheric pressure. Furthermore, in the exemplary embodiment, depressurization port 518 includes a fine filter device 536, such as, for example, a screen, a wire mesh, a plate (not shown) with holes, slots, and/or openings, and/or any other suitable filter device that causes slag 528 to remain within channel 508 as pressure in channel 508 is decreased from pressure $P_{HI(5)}$ to pressure $P_{D(5)}$ as liquid 534 exits rotary apparatus 500.

Figure 6:
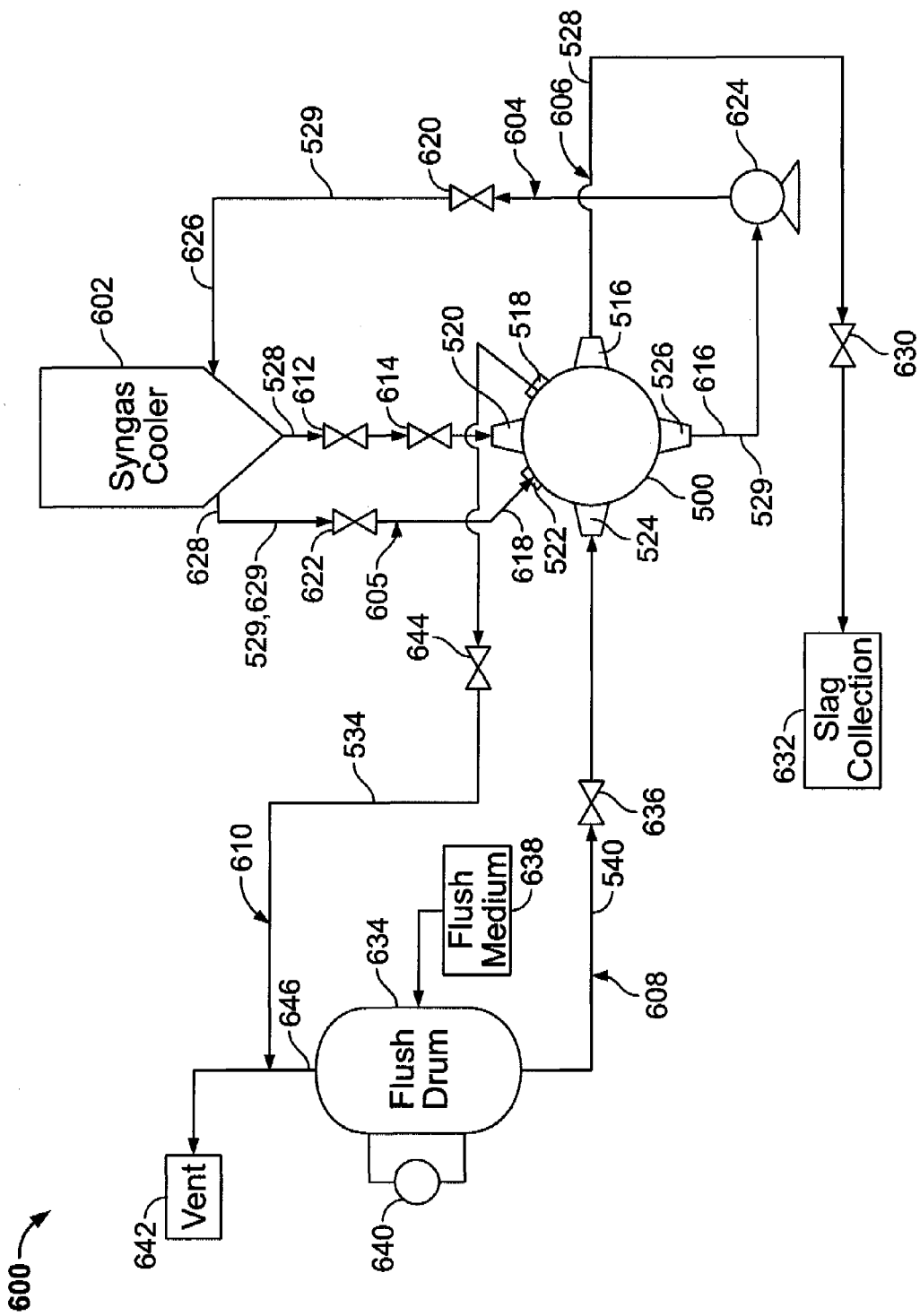
FIG. 6 is a schematic view of an exemplary system in which the rotary apparatus shown in FIG. 5A may be used.

In the exemplary embodiment, low-pressure inlet port 524 is coupled to a rotor flush device 538, such as, for example, a low-pressure slag flush drum 634 (shown in FIG. 6). More specifically, rotor flush device 538 includes a flush medium 540, for example, but not limited to, water, a gaseous compound, a liquid compound, and/or any other medium that enables rotary apparatus 500 to function as described herein. Flush medium 540 enters rotor channel 508 through low-pressure inlet port 524 at a pressure $P_{LI(5)}$ wherein pressure $P_{LI(5)}$ is approximately equal to atmospheric pressure. Alternatively, pressure $P_{LI(5)}$ is at any other pressure that is less than pressure $P_{HI(5)}$ and/or pressure $P_{HO(5)}$ and greater than $P_{LO(5)}$ and that enables rotary apparatus 500 to function as described herein.

Furthermore, in the exemplary embodiment, slag 528 flushed from channel 508 by flush medium 540 exits rotary apparatus 500 through low-pressure outlet port 516. More specifically, as described above, low-pressure outlet port 516 and low-pressure inlet port 524 are circumferentially-spaced within housing 502 such that ports 516 and 524 substantially oppose each other. As such, in the exemplary embodiment, when channel first end 510 is substantially aligned with low-pressure outlet port 516, channel second end 512 is substantially aligned with low-pressure inlet port 524, such that flush medium 540 enters low-pressure inlet port 524. The flush medium 540 is channeled through channel 508 such that slag 528 exits housing 502 through low-pressure outlet port 516. In the exemplary embodiment, slag 528 exits low-pressure outlet port 516 at a pressure $P_{LO(5)}$, wherein pressure $P_{LO(5)}$ is approximately equal to pressure $P_{LI(5)}$. Alternatively, pressure $P_{LO(5)}$ is at any other pressure that enables rotary apparatus 500 to function as described herein.

In the exemplary embodiment, repressurization port 522 is coupled to a repressurization source 542, such that port 522 is at a pressure $P_{R(5)}$. More specifically, repressurization source 542 may be, for example, but is not limited to being, repressurization line 605 (shown in FIG. 6). Furthermore, in the exemplary embodiment, repressurization source 542 includes a repressurization medium 544 such as, for example, gas, water, fine slag particles, and/or any other suitable medium that enables rotary apparatus 500 to function as described herein. In the exemplary embodiment, pressure $P_{R(5)}$ is greater than pressures $P_{LI(5)}$, $P_{LO(5)}$, and/or $P_{D(5)}$. More specifically, in the exemplary embodiment, pressure $P_{R(5)}$ is approximately equal to pressure $P_{HO(5)}$ and/or pressure $P_{HI(5)}$. Alternatively, $P_{R(5)}$ may be at any other pressure that enables rotary apparatus 500 to function as described herein. In an alternative embodiment, repressurization source 542 includes a fine filter device (not shown), such as, for example, a screen, a wire mesh, a plate (not shown) with holes, slots, and/or openings, and/or any other suitable filter device, such that solid particles (not shown) remain within repressurization source 542 substantially without interfering with repressurization. In one embodiment, the filter device includes isolation and/or cleaning means (not shown), as described above. In the exemplary embodiment, repressurization medium 544 flows into channel 508 to increase pressure in channel 508 from pressure $P_{LI(5)}$ and/or pressure $P_{LO(5)}$ to pressure $P_{R(5)}$.

In the exemplary embodiment, rotary apparatus 500 also includes a lubricant 548 between housing 502 and rotor 504. More specifically, lubricant 548 is applied to both outer surface 506 of rotor 504 and to an inner surface 550 of housing 502. Lubricant 548 may be, for example, but is not limited to being, a solid lubricant, such as, graphite, molybdenum sulfide, boron nitride, polytetrafluoroethylene (PTFE), and/or any other suitable lubricant that enables rotary apparatus 500 to function as described herein. Further, lubricant 548 may be applied to rotor 504 and/or housing 502 by, for example, spraying, painting, and/or any suitable application technique.

In operation, rotor 504 rotates clockwise about centerline 60 within housing 502 to continuously remove slag 528 from the syngas cooler and/or the gasifier. More specifically, when channel first end 510 is generally aligned with high-pressure inlet port 520, as shown in FIG. 5A, slag 528 at high-pressure inlet pressure $P_{HI(5)}$ is loaded into channel 508 by, for example, gravity, such that channel 508 is substantially filled with slag 528 and associated fluid. When rotor 508 is in orientation 5A, fine slag particles 529 and water are discharged from channel second end 512 through filter device 530 and into high-pressure outlet port 526 via, for example, gravitational force, and coarse particles of slag 528 remain within channel 508 for subsequent discharge.

In the exemplary embodiment, rotor 504 rotates clockwise such that channel first end 510 rotates from being generally aligned with high-pressure inlet port 520 to being generally aligned with depressurization port 518, as shown in FIG. 5B. When rotor 504 is at orientation 5B, water and/or gas 534 exits channel 508 and flows through filter device 536 and depressurization port 518 such that pressure within channel 508 decreases from $P_{HI(5)}$ and/or pressure $P_{HO(5)}$ to pressure $P_{D(5)}$ while retaining slag 528 within channel 508. Further, when rotor 504 is at orientation 5B, in the exemplary embodiment, channel second end 512 is substantially sealed by housing 502.

Further, in the exemplary embodiment, rotor 504 rotates clockwise such that channel first end 510 rotates from being generally aligned with depressurization port 518 to being generally aligned with low-pressure outlet port 516, and channel second end 512 generally aligns with low-pressure inlet port 524, as shown in FIG. 5C. When rotor 504 is in orientation 5C, flush medium 540 enters rotor channel 508 through low-pressure inlet port 524 to force slag 528 to be discharged through low-pressure outlet port 516. In the exemplary embodiment, the flow of flush medium 540 is terminated by rotor outer surface 506 when channel 508 is substantially free of slag 528. As such, channel 508 includes a reduced amount of slag 528 after flush medium 540 flows through channel 508 Further, as rotor 104 rotates, rotor 504 generally includes flush medium 540, fine slag particulate, water, and/or any other suitable material that enables apparatus 500 to function as described herein.

As rotor 504 continues to rotate within housing 502, channel second end 512 rotates from generally being aligned with port 524 to being generally aligned with repressurization port 522, and first channel end 510 is substantially sealed by housing 502, as shown in FIG. 5D. When channel 508 is at orientation 5D, repressurization source 542 repressurizes channel 508 from pressure $P_{LI(5)}$ and/or pressure $P_{LO(5)}$ to approximately $P_{R(5)}$ by discharging repressurization medium 544 into channel 508. During rotor 504 rotation, lubricant 548 reduces friction forces between rotor 504 and housing 502 and also seals a gap 552 between rotor 504 and housing 502. In one embodiment, gap 552 may be automatically controlled by a pressure feedback control loop (not shown) to prevent the development of leak channels (not shown) between rotor 504 and housing 502.

For example, in one embodiment, radius $R_5$ of rotor 504 reduces uniformly along an axial length (not shown) of rotor 504 from a larger radius on one end (not shown) to a smaller radius on the other end (not shown). Accordingly, inner surface 550 of housing 502 is correspondingly tapered to form a uniform gap 552 between rotor 504 and housing 502, when rotor 504 centered axially within housing 502. Furthermore, in another embodiment, apparatus 500 includes an adjustment mechanism (not shown) to enable the adjustment of the relative axial position of rotor 504 within housing 502, wherein the adjustment mechanism may be operable during operation of rotary apparatus 500 such that gap 552 may be adjusted. Furthermore, in another embodiment, housing seals (not shown), such as, seal inserts 208 and/or 210 (shown in FIGS. 2 and 3), may be used to facilitating reducing pressure leaks between rotor 504 and housing 502.

FIG. 6 is a schematic view of an exemplary system 600 in which rotary apparatus 500 shown in FIGS. 5A-5D may be used. System 600 may be used to remove slag 528 (shown in FIGS. 5A-5D) from a syngas cooler 602, as described in more detail herein. System 600 includes rotary apparatus 500, syngas cooler 602, a slag circulation circuit 604, a slag collection line 606, a slag flush line 608, and a vent line 610.

In the exemplary embodiment, syngas cooler 602, for example, a radiant syngas cooler, includes slag 528 therein that was formed during gasification. In the exemplary embodiment, gasifier cooler 602 is a device and/or process and/or a group of devices and/or processes collectively used to ensure that slag 528 has been adequately cooled for removal by apparatus 500. Moreover, syngas cooler 602 is coupled to rotary apparatus 500, at, for example, high-pressure inlet port 520, to facilitate removal of slag 528 therefrom. In the exemplary embodiment, a series of valves 612 and 614 are coupled between syngas cooler 602 and rotary apparatus 500 for controlling the flow of slag 528 from syngas cooler 602 to rotary apparatus 500. More specifically, in the exemplary embodiment, valve 612 is, for example, a slag discharge safety valve, and valve 614 is, for example, a slag discharge inlet valve. Alternatively, system 600 includes more or less than two valves 612 and 614.

In the exemplary embodiment, slag circulation circuit 604 is coupled to rotary apparatus 500. More specifically, in the exemplary embodiment, a circuit inlet 616 is coupled to high-pressure outlet port 526. As such, in the exemplary embodiment, circuit 604 is at a pressure that is sufficiently higher than pressure $P_{HO(5)}$ and/or pressure $P_{R(5)}$, wherein "sufficiently higher" refers to a pressure that enables material in circuit 604 to readily flow into syngas cooler 602. Furthermore, in the exemplary embodiment, circuit 604 includes a valve 620, a pump 624, and a cooler/gasifier inlet 626. More specifically, in the exemplary embodiment, circuit 604 includes, in series, circuit inlet 616, pump 624, valve 620, and cooler/gasifier inlet 626. In the exemplary embodiment, pump 624 is, but is not limited to being, a slag discharger circulation pump, valve 620 is, but is not limited to being, a flow block valve. Alternatively, circuit 604 includes pumps other than pump 624 and/or valves other than valve 620. In the exemplary embodiment, fine slag particles 529 and/or liquid and/or gas 629 within circuit 604 are re-introduced to syngas cooler 602.

In the exemplary embodiment, system 600 includes means (not shown) for reducing the content of fine slag particles 529 in the slag circulation circuit 604, syngas cooler 602, and/or repressurization line 605. Such means may be, for example, but not limited to being, blowdown and makeup water lines to and from slag circulation circuit 604, syngas cooler 602, and repressurization line 605, respectively.

Repressurization line 605, in the exemplary embodiment, includes a line inlet 628, a valve 622, such as, but is not limited to being, a repressurization valve, and a line outlet 618. More specifically, in the exemplary embodiment, inlet 628, valve 622, and outlet 618 are coupled in series between syngas cooler 602 and repressurization port 522. As such, line 605 is at a pressure that is approximately equal to pressure $P_{R(5)}$ and/or pressure $P_{HO(5)}$. Although only one valve 622 is coupled to repressurization line 605, line 605 may include any number of valves and/or other components that enable system 600 to function as described herein. In the exemplary embodiment, line 605 is configured to enable water 629 having fine slag particles 529 suspended therein to be discharged from cooler 602 into rotary apparatus 500, as described in more detail below. In one embodiment, water and gas 629 having fine slag particles 529 suspended therein are discharged from 602 into line 605. In an alternative embodiment, repressurization line 605 includes one or more pumps (not shown) and/or accumulation vessels (not shown) to facilitate increasing the hydraulic head and/or to ensure a ready supply of repressurization medium 544 to apparatus 500.

Slag collection line 606, in the exemplary embodiment, is coupled to rotary apparatus 500 at, for example, low-pressure outlet port 516. In the exemplary embodiment, slag collection line 606 includes a valve 630 and a slag collection device 632. Further, in the exemplary embodiment, valve 630 is coupled between slag collection device 632 and rotary apparatus 500. Alternatively, additional valves 630 are coupled between apparatus 500 and slag collection device 632. In the exemplary embodiment, slag collection line 606 may also include, but is not limited to including, a slag conveyor (not shown), a slag bin (not shown), a slag storage unit, and/or any other components that enable system 600 to function as described herein. Furthermore, in the exemplary embodiment, slag 528 within slag collection line 606 is at pressure $P_{LO(5)}$.

In the exemplary embodiment, slag flush line 608 is coupled to rotary apparatus 500, at, for example, low-pressure inlet port 524, for removing slag 528 from apparatus 500. More specifically, in the exemplary embodiment, slag flush line 608 includes a flush drum 634 and a valve 636 coupled, for example, in series, to apparatus 500. Slag flush drum 634, in the exemplary embodiment, is coupled to a flush medium source 638, which includes flush medium 540, that may be, for example, but is not limited to being, plant recycle water and/or any other suitable medium that enables system 600 to function as described herein. In the exemplary embodiment, flush medium 540 within flush drum 634 is at pressure $P_{LI(5)}$. Flush drum 634, in the exemplary embodiment, includes a sensor 640, such as, for example, a water level sensor, coupled thereto to monitor an amount of flush medium 540 within flush drum 634. Furthermore, in the exemplary embodiment, valve 636, for example, a slag discharger flush drum valve, facilitates controlling a flow of flush medium 540 from flush drum 634 to apparatus 500. Alternatively, slag flush line 608 includes other than one valve 636. In an alternative embodiment, slag flush line 608 includes one or more pumps (not shown) and/or accumulation vessels (not shown) to facilitate increasing the hydraulic head and/or to ensure a ready supply of flush medium 540 to apparatus 500.

In the exemplary embodiment, vent line 610 is coupled to rotary apparatus 500, for example, at depressurization port 518, to depressurize apparatus 500. More specifically, in the exemplary embodiment, vent line 610 is coupled between apparatus 500 and a vent 642 and includes a valve 644, such as, for example, a depressurization valve. Valve 644 facilitates controlling a flow of, for example, vented water and/or gas 534 having fine slag particles 529, within vent line 610. Alternatively, vent line 610 includes additional valves 644. In the exemplary embodiment, vent 642 and vent line 610 are each at pressure $P_{D(5)}$. Furthermore, in the exemplary embodiment, flush drum 634 is coupled to vent line 610 for venting of gas 646 from flush drum 634. Alternatively, flush drum 634 is other than coupled to vent line 610.

Referring to FIGS. 5A-5D and FIG. 6, during operation of system 600, in the exemplary embodiment, slag 528 flows from syngas cooler 602, through valves 612 and 614, and into apparatus high-pressure inlet port 520 at pressure $P_{HI(5)}$. When rotor 504 is in orientation 5A, slag 528 is received in channel 508 through channel first end 510, and fine particles 529 of received slag 529 and/or water is discharged from channel second end 512 through filter device 530 of high-pressure outlet port 526 at pressure $P_{HO(5)}$. More specifically, in the exemplary embodiment, water and/or fine particles 529 of slag 528 that pass through filter device 530 are discharged to slag circulation circuit 604, and particles of slag 528 that cannot pass through filter device 530 are retained in channel 508 for transport to slag collection line 606.

In the exemplary embodiment, water and/or fine slag particles 529 entering slag circulation circuit 604 is pumped by pump 624 through valve 620 into syngas cooler 602. Fine particles of slag 529 enter syngas cooler 602. Slag particles 529, water, and/or gas 629 is discharged from syngas cooler 602 into line 605 and flows through valve 622 and into rotary apparatus 500, via repressurization port 522, to facilitate repressurizing channel 508, as described herein. In the exemplary embodiment, slag particles 529 and water 629 flow from line 605 into repressurization port 522 is at pressure $P_{R(5)}$.

When rotor 504 rotates from orientation 5A to orientation 5B, in the exemplary embodiment, channel 508 is depressurized when water and/or gas 534 within channel 508 discharges from apparatus 500, through depressurization port 518 and filter device 536, and into vent line 610. More specifically, in the exemplary embodiment, channel 508 is depressurized from pressure $P_{HI(5)}$ and/or pressure $P_{HO(5)}$ to pressure $P_{D(5)}$. In the exemplary embodiment, gas 534 entering vent line 610 flows through valve 644 to vent 642 for removal from system 600. Alternatively, material within vent line 610 may be other than removed from system 600.

In the exemplary embodiment, flush medium 540 is supplied to flush drum 634 from source 638. Furthermore, in the exemplary embodiment, flush medium 540 is channeled from flush drum 634, through valve 636, and into flush line 608 such that flush medium 540 is contained within low-pressure inlet port 524, adjacent to rotor 504, when channel 508 is not aligned with port 524. When rotor 504 rotates from orientation 5B to orientation 5C, in the exemplary embodiment, flush medium 540 within flush line 608 enters channel 508 at pressure $P_{LI(5)}$ through low-pressure inlet port 524. Flush medium 540 forces slag 528 from channel 508 through low-pressure outlet port 516, and into slag collection line 606, as described herein. Slag 528 and/or flush medium 540 is discharged into slag collection line 606 and is, in the exemplary embodiment, removed from system 600.

When rotor 504 rotates to orientation 5D, channel 508 is repressurized from pressure $P_{LI(5)}$ and/or pressure $P_{LO(5)}$ to pressure $P_{R(5)}$. More specifically, in the exemplary embodiment, water and/or gas 629, which may have fine slag particles 529 suspended therein, within repressurization line 605 is discharged from line 605 through repressurization port 522, into channel 508 at pressure $P_{R(5)}$. Further, in the exemplary embodiment, rotor 504 rotates repressurized channel 508 to orientation 5A to receive slag 528 from syngas cooler 602, as described above.

Figure 7:
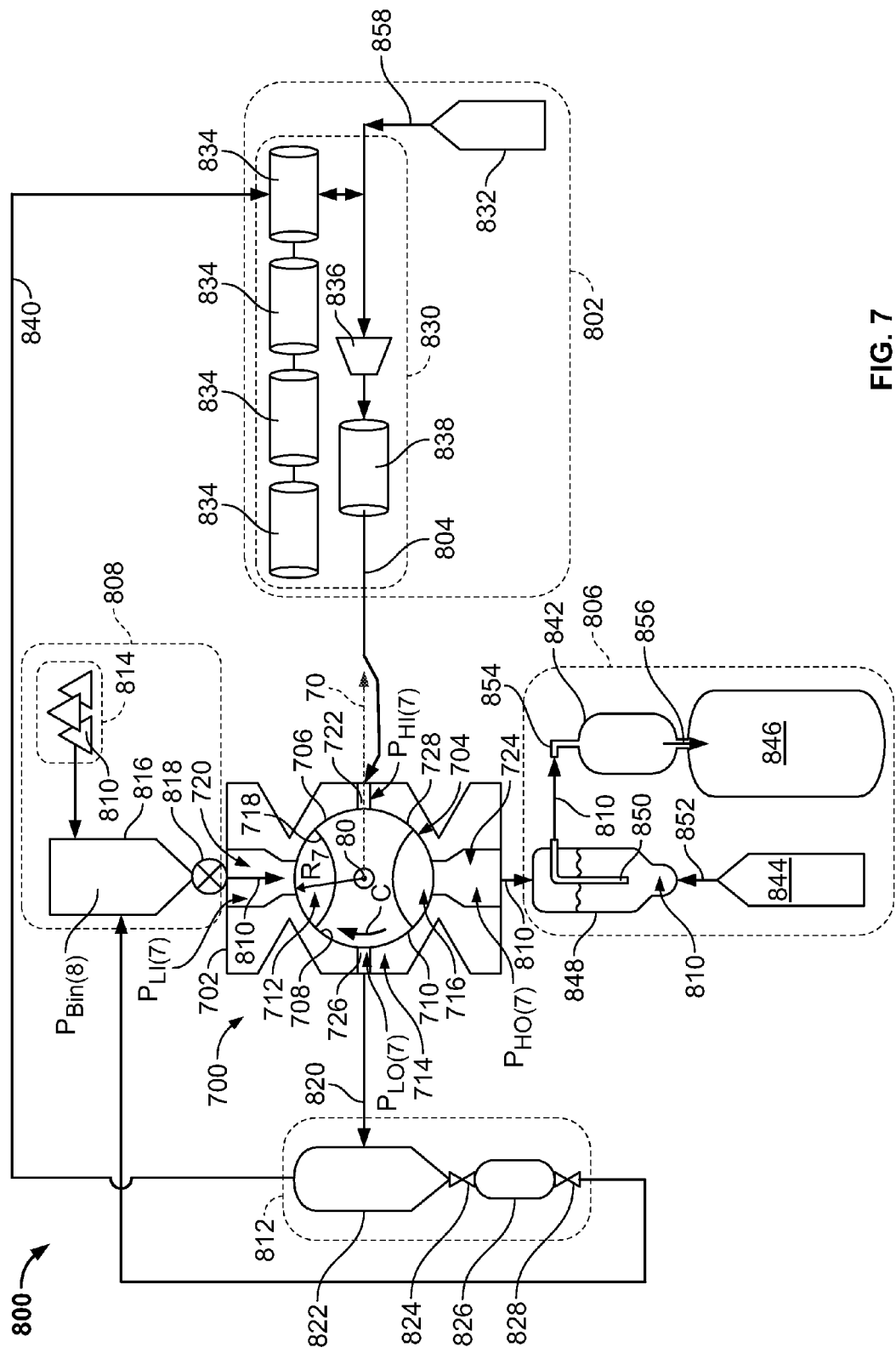
FIG. 7 is a schematic view of an exemplary alternative rotary device within an alternative exemplary system.

FIG. 7 is a schematic view of an exemplary alternative rotary apparatus 700 within an alternative exemplary system 800. More specifically, within FIG. 7, rotary apparatus 700 is at a first orientation, for example, but not limited to, a 90° orientation. Although orientations of rotary apparatus 700 are described as being at 90° from a reference direction 70, it should be understood that the values for the orientation degrees are exemplary only, are only illustrated for clarity of description, and are in no way limiting. For example, the components of rotary apparatus 700 may be oriented at any degree from reference direction 70 that enables rotary apparatus 700 to function as described herein. In the exemplary embodiment, reference direction 70 is oriented substantially radially with respect to an axial centerline 80 of apparatus 700. Furthermore, all angles referred to below are measured counter-clockwise from reference direction 70 unless otherwise stated.

In the exemplary embodiment, rotary apparatus 700 includes a housing 702 and a rotor 704. More specifically, housing 702 and rotor 704 are substantially concentrically aligned and have a common axial centerline 80. Housing 702 may include a port sealing configuration (not shown) that is substantially similar to the sealing configuration shown in FIGS. 2 and 3. Further, in the exemplary embodiment, rotor 704 has a radius $R_7$ measured from centerline 80 to an outer surface 706 of rotor 704. In an alternative embodiment, rotor radius $R_7$ tapers substantially uniformly along an axial length (not shown) of rotor 704 from a larger radius (not shown) on one end (not shown) to a smaller radius (not shown) on the opposite end (not shown). Accordingly, an inner surface 708 of housing 702 is also tapered to form a substantially uniform gap 710 between rotor 704 and housing 702, when rotor 704 is substantially centered within housing 702. Furthermore, in an alternative embodiment, apparatus 700 includes an adjustment mechanism (not shown) that enables selective adjustment of rotor 704 within housing 702.

Rotor 704, in the exemplary embodiment, includes at least one pocket 712 (also referred to herein as a "closed pocket") that is defined within rotor outer surface 706. In the exemplary embodiment, apparatus 700 includes a group 714 of a first pocket 712 and a second pocket 716 that are circumferentially-spaced along rotor outer surface 706 such that, for example, pockets 712 and 716 are approximately 180° from each other. Alternatively, group 714 may include any suitable number of pockets 712 and/or 716 having any suitable spacing with respect to rotor 704. Although only one set 714 of pockets 712 and/or 716 is described herein, rotor 704 may include a plurality of sets 714 of pockets 712 and/or 716 that may each be rotationally offset from adjacent sets 714 of pockets 712 and/or 716, by for example, an eighth of a rotation. Furthermore, although only first pocket 712 is described herein, it should be understood that second pocket 716 is substantially similar to first pocket 712 except that second pocket 716 is spaced from first pocket 712 along outer surface 706 of rotor 704.

In the exemplary embodiment pocket 712 is illustrated with an elliptical and/or circular cross-sectional profile, however pocket 712 may have any suitable cross-sectional shape that enables rotary apparatus 700 to function as described herein. In one embodiment, pocket 712 has a cross-sectional shape that facilitates reducing areas, such as corners, in which solid particles may accumulate and be retained within pocket 712. Additionally, in the exemplary embodiment, an inner surface 718 of pocket 712 is polished, coated, and/or otherwise treated to facilitate reducing friction along inner surface 718.

In the exemplary embodiment, housing 702 includes a plurality of ports 720, 722, 724, and 726. More specifically, in the exemplary embodiment, housing 702 includes a low-pressure inlet port 720, a high-pressure inlet port 722, a high-pressure outlet port 724, and a low-pressure outlet port 726. In the exemplary embodiment, high-pressure inlet port 722 is oriented at an angle of, for example, approximately 0°, low-pressure inlet port 720 is oriented at an angle of, for example, approximately 90°, low-pressure outlet port 726 is oriented at an angle of, for example, approximately 180°, and high-pressure outlet port 724 is oriented at an angle of, for example, approximately 270°. Alternatively, ports 720, 722, 724, and/or 726 are at different orientations than those described above, but are spaced in the same circumferential order about housing 702. More specifically, in the exemplary embodiment, high-pressure outlet port 724 is oriented to oppose low-pressure inlet port 720, low-pressure outlet port 726 is oriented between high-pressure outlet port 724 and low-pressure inlet port 720 in a direction of rotation C, and high-pressure inlet port 722 is oriented between low-pressure inlet port 720 and high-pressure outlet port 724 in a direction of rotation C. In the exemplary embodiment direction of rotation C is clockwise.

In an alternative embodiment, wherein direction of rotation C is counter-clockwise, low-pressure outlet port 726 is oriented at an angle of, for example, approximately 180° from its position about housing 702, as illustrated and described in the exemplary embodiment. For example, low-pressure outlet port 726 is oriented at an angle of, but is not limited to being oriented at angle of, approximately 0° from reference direction 70. Similarly, in the alternative embodiment, high-pressure inlet port 722 is oriented at an angle of, for example, approximately 180° from its position about housing 702, as illustrated and described in the exemplary embodiment. For example, high-pressure inlet port 722 is oriented at an angle of, but is not limited to being oriented at an angle of, approximately 180° from reference direction 70.

In the exemplary embodiment, high-pressure inlet port 722 is coupled to a high-pressure source, such as high-pressure source 802, that supplies, for example, but is not limited to only supplying, high-pressure gas 804, into rotor pocket 712 during operation. High-pressure gas 804 may be, for example, nitrogen gas ($N_{2(g)}$) at a pressure $P_{HI(7)}$, which is approximately equal to, for example, about 800 psi. Furthermore, in the exemplary embodiment, high-pressure outlet port 724 is coupled to a gasifier system, such as, for example, gasifier system 806, and is at a pressure $P_{HO(7)}$, which is approximately equal to, for example, about 750 psi.

In the exemplary embodiment, low-pressure inlet port 720 is coupled to a feedstock source, such as, for example, feedstock source 808. As such, in the exemplary embodiment, low-pressure inlet port 720 includes feedstock 810 from feedstock source 808 at a pressure $P_{LI(7)}$, which is equal to, for example, approximately atmospheric pressure. Feedstock 810 may include particles of solid fuel, such as, for example, coal, petroleum coke, wastes, biomasses, and/or any other suitable gasifier feedstock, either wet or dry, in lump and/or ground form. In the exemplary embodiment, feedstock 810 is a free-flowing particulate. Furthermore, in the exemplary embodiment, low-pressure outlet port 726 is coupled to a low-pressure source, such as, for example, a dust filter, such as dust filter 812, the atmosphere, a vacuum, and/or any other suitable low-pressure source that enables rotary apparatus 700 to function as described herein, such that low-pressure outlet port 726 has a pressure $P_{LO(7)}$, that is less than high-pressure outlet pressure $P_{HO(7)}$ and approximately equal to pressure $P_{LI(7)}$.

Furthermore, in one embodiment, low-pressure outlet port 726 includes a filter device (not shown), such as, for example, a screen, a wire mesh, a plate (not shown) with holes, slots, and/or openings, and/or any other suitable filter device. In the exemplary embodiment, the filter device is a part of, and/or is closely coupled to, low-pressure outlet port 726, and includes isolation and cleaning means (not shown) to facilitate isolation and cleaning substantially without interfering with the reduction in pressure in pocket 712 during operation of rotary apparatus 700. In the exemplary embodiment, isolation and cleaning means may be, for example, but is not limited to being, a dual parallel filter arrangement (not shown) including isolation and vent valves. The dual parallel filter arrangement may include a device for using a back-flushing medium, and/or a device for recovering the particulate released from the filter device by such back-flushing and/or cleaning.

In another embodiment, the filter device does not include isolation and/or cleaning capabilities. In still another alternative embodiment, the filter device is not a part of, and/or is not closely coupled to, rotary apparatus 700, but, rather, the filter device is positioned downstream from low-pressure outlet port 726. For example, the filter device may be located between rotary apparatus 700 and dust filter 812. In one embodiment, the filter device includes openings that are larger than a feed particle size. In still another embodiment, low-pressure outlet port 726 is replaced by two or more low-pressure outlet ports (not shown) that can be operated independently to facilitate the operation of rotary apparatus 700, such as, but not limited to, depressurization, isolation, cleaning, and/or back-flushing of rotary apparatus 700, the filter device, and/or any other associated filter devices (not shown).

In the exemplary embodiment, rotary apparatus 700 also includes a lubricant 728 between housing 702 and rotor 704. More specifically, lubricant 728 is applied to both rotor outer surface 706 and to inner surface 708 of housing 702. Lubricant 728 may be, for example, but is not limited to being, a solid lubricant, such as, graphite, molybdenum sulfide, boron nitride, Polytetrafluoroethylene (PTFE), and/or any other suitable lubricant that enables rotary apparatus 700 to function as described herein. Further, lubricant 728 may be applied to rotor 704 and/or housing 702 by, for example, spraying, painting, and/or any suitable application technique.

In the exemplary embodiment, system 800 includes rotary apparatus 700, feedstock source 808, dust filter 812, high-pressure source 802, and gasifier system 806. System 800 may be used to gasify feedstock 810, as described in more detail herein. In the exemplary embodiment, feedstock source 808 includes feedstock storage 814, a feedstock bin 816, and a rotary valve 818. More specifically, feedstock storage 814 is coupled to feedstock bin 816. Feedstock bin 816 includes feedstock therein, such as, for example feedstock 810, which, in the exemplary embodiment, is dry, ground sub-bituminous coal. In one embodiment, feedstock 810 is coal, and more specifically, is a low-rank coal. Feedstock 810 within feedstock storage 814 may be in lump form, ground form, and/or any other form that enables system 800 to function as described herein. In the exemplary embodiment, feedstock 810 within feedstock bin 816 is at a pressure $P_{bin(8)}$ that is approximately equal to atmospheric pressure, such that pressure $P_{bin(8)}$ is approximately equal to pressure $P_{LI(7)}$. Alternatively, pressure $P_{bin(8)}$ may be at a pressure other than atmospheric pressure and/or pressure $P_{LI(7)}$. Furthermore, in the exemplary embodiment, feedstock source 814 is coupled to rotary apparatus 700 at low-pressure inlet port 720 such that feedstock 810 is supplied by feedstock source 808 to rotary apparatus 700. More specifically, in the exemplary embodiment, feedstock bin 816 is coupled to rotary apparatus 700 via rotary valve 818. Moreover, in the exemplary embodiment, rotary valve 818 controls a flow of feedstock 810 from feedstock bin 816 to rotary apparatus 700 without adversely affecting the pressure of feedstock 810. In another embodiment, rotary valve 818 is any valve and/or apparatus that facilitates ensuring a consistent flow of solids through rotary apparatus 700.

In the exemplary embodiment, dust filter 812 is coupled to rotary apparatus low-pressure outlet port 726 for collecting a dust mixture 820, such as, feedstock dust and/or transport gas, discharged from rotary apparatus 700 port 726. Dust filter 812 includes, in the exemplary embodiment, a filtering device 822, a first valve 824, a collection bin 826, and a second valve 828. In the exemplary embodiment, dust mixture 820 enters dust filter filtering device 822 from rotary apparatus 700 at pressure $P_{LO(7)}$ and flows from filtering device 822 through first valve 824 to collection bin 826. Dust mixture 820 may be discharged from collection bin 826, through valve 828, into, for example, feedstock bin 816.

In the exemplary embodiment, high-pressure source 802 includes a compressor skid 830 and a low-pressure gas source 832. More specifically, in the exemplary embodiment, low-pressure gas source 832 includes low-pressure $N_{2(g)}$ from an Air Separation Unit (ASU) (not shown). Alternatively, low-pressure gas source 832 may include low-pressure gas other than $N_{2(g)}$ from the ASU. Moreover, in the exemplary embodiment, compressor skid 830 includes a plurality of low-pressure gas drums 834, a compressor 836, and a high-pressure gas drum 838. More specifically, in the exemplary embodiment, low-pressure gas source 832 is coupled to low-pressure gas drums 834 and compressor 836, low-pressure gas drums 834 are also coupled to compressor 836, and compressor 836 is coupled to high-pressure gas drum 838. High-pressure gas drum 838, in the exemplary embodiment, is coupled to rotary apparatus high-pressure inlet port 722 to supply high-pressure gas 804 to rotary apparatus 700 at pressure $P_{HI(7)}$. Further, in the exemplary embodiment, low-pressure gas 840 may be vented from dust filter 812 to at least one low-pressure gas drum 834. Additionally, in the exemplary embodiment, compressor skid 830 is configured to be a plant wide system. Although in the exemplary embodiment high-pressure source 802 is configured as described above, high-pressure source 802 may have any configuration that enables rotary apparatus 700 and/or system 800 to function as described herein.

Gasifier system 806, in the exemplary embodiment, includes a gasifier 842, a conveying gas source 844, and a syngas cooler 846, and a gasifier feed vessel 848. More specifically, in the exemplary embodiment, gasifier 842 is an entrained flow gasifier. In the exemplary embodiment, feed vessel 848 is coupled to rotary apparatus high-pressure outlet port 724. As such, feed vessel 848 and/or gasifier system 806 is supplied with feedstock 810 from rotary apparatus 700 at pressure $P_{HO(7)}$. In the exemplary embodiment, feed vessel 848 retains feedstock 810, and a feed tube 850 extends through feed vessel 848 to facilitate discharging feedstock 810 from vessel 848. More specifically, feed tube 850 extends into feedstock 810 retained within vessel 848. Conveying gas source 844 is coupled to feed vessel 848 and is configured to inject a conveying gas 852 into feed vessel 848. In an alternative embodiment, conveying gas source 844 also is coupled with feed tube 850 and configured to inject additional conveying gas into feed tube 850. In the exemplary embodiment, conveying gas 852 supplied from conveying gas source 844 to feed vessel 848, and optionally to feed tube 850, may be, for example, sour carbon dioxide, sour gas, acid gas, and/or any other gas that enables gasifier system 806 and system 800 to function as described herein.

In the exemplary embodiment, feed tube 850 is coupled in flow communication with a gasifier injector 854. Gasifier injector 854 is coupled in flow communication with gasifier 842 and is configured to inject feedstock 810 into gasifier 842. Syngas cooler 846 is coupled in flow communication with gasifier 842 such that syngas cooler 846 receives syngas 856 produced in gasifier 842. Syngas cooler 846 may be connected to any suitable component for using and/or storing produced syngas 856.

During operation, rotor 704 rotates in direction C clockwise about centerline 80 within housing 702 to continuously transport feedstock 810 from feedstock source 808 to gasifier system 806. In the exemplary embodiment, although the operation of pocket 712 is described herein, it will be understood that as rotor 704 rotates, second pocket 716 functions substantially similar to first pocket 712, except second pocket 716 is generally aligned with a port 720, 722, 724, and/or 726 other than the port 720, 722, 724, and/or 726 first pocket 712 is generally aligned with. More specifically, in the exemplary embodiment, when first pocket 712 is generally aligned with low-pressure inlet port 720, second pocket 716 is generally aligned with high-pressure outlet port 724, when first pocket 712 is generally aligned with high-pressure inlet port 722, second pocket 716 is generally aligned with low-pressure outlet port 726, when first pocket 712 is generally aligned with high-pressure outlet port 724, second pocket 716 is generally aligned with low-pressure inlet port 720, and when first pocket 712 is generally aligned with low-pressure outlet port 726, second pocket 716 is generally aligned with high-pressure inlet port 722.

In the exemplary embodiment, when pocket 712 is generally aligned with low-pressure inlet port 720, feedstock 810 at low-pressure inlet pressure $P_{LI(7)}$ is loaded into pocket 712 by gravity, such that pocket 712 is substantially filled with feedstock 810. As rotor 704 rotates clockwise, pocket 712 rotates from being generally aligned with low-pressure inlet port 720 to being generally aligned with high-pressure inlet port 722. When rotor 704 is at such an orientation, low-pressure inlet port 720 is substantially sealed by rotor outer surface 706, and high-pressure gas 804 at pressure $P_{HI(7)}$ is supplied to pocket 712 such that feedstock 810 is pressurized from pressure $P_{LI(7)}$ to pressure $P_{HO(7)}$. In the exemplary embodiment, when pocket 712 is generally aligned with high-pressure outlet port 724, feedstock 810 at pressure $P_{HO(7)}$ is supplied to gasifier system 806. More specifically, gravity forces feedstock from pocket 712 though port 724, and into gasifier system 806.

As rotor 704 continues to rotate within housing 702, pocket 712 rotates from being generally aligned with high-pressure outlet port 724 to being generally aligned with low-pressure outlet port 726. When pocket 712 is at such an orientation, dust filter 812 depressurizes pocket 712 from pressure $P_{HO(7)}$ to pressure $P_{LO(7)}$. In one embodiment, any particles of feedstock 810 are pulled against and/or through the filter device. More specifically, particles that pass through the filter device are collected in dust filter 812, and particles that cannot pass through the filter device are retained in pocket 712 for transport to gasifier system 806 during a subsequent rotation and/or are retained within the filter device to be subsequently removed from the filter device, for example, when portions (not shown) of the filter device are isolated for cleaning and/or back-flushing.

As rotor 704 continues to rotate, pocket 712 is aligned generally with low-pressure inlet port 720 such that feedstock 810 is continuously supplied to gasifier system 806, as described above. Furthermore, during rotor 704 rotation, lubricant 728 reduces frictional forces between rotor 704 and housing 702 and also substantially seals gap 710 between rotor 704 and housing 702. Furthermore, in one embodiment, the sealing configuration of housing 702 also reduces pressure leaks between rotor 704 and housing 702.

During operation of system 800, in the exemplary embodiment, feedstock 810, at pressure $P_{LI(7)}$, is supplied through feedstock bin 816 and rotary valve 818, into low-pressure inlet port 720. Pocket 712 is substantially filled with feedstock 810 when pocket 712 is generally aligned with low-pressure inlet port 720. Furthermore, in the exemplary embodiment, low-pressure gas 858 and/or 840 flows from low-pressure gas source 832 and/or dust filter 812, respectively, through compressor 836, and into high-pressure gas drum 838 for discharge, at pressure $P_{HI(7)}$, into rotary apparatus pocket 712 when pocket 712 is generally aligned with high-pressure inlet port 722. Moreover, in the exemplary embodiment, when pocket 712 is generally aligned with high-pressure outlet port 724, feedstock 810, at pressure $P_{HO(7)}$, is discharged from rotary apparatus pocket 712, as described herein, through rotary apparatus high-pressure outlet port 724, and into feed vessel 848 for retention therein.

Conveying gas 852 is injected into feed vessel 848 from conveying gas source 844. Injected conveying gas 852 forces feedstock 810 into feed tube 850 for discharge from feed vessel 848. Feedstock 810 injected from feed vessel 848 enters a gasifier injector 854 for injection of feedstock 810 into gasifier 842. Once feedstock 810 enters gasifier 842, syngas 856 is produced using feedstock 810, conveying gas 852, and/or any other suitable materials that enable syngas 856 to be produced. The produced syngas 856 is discharged from gasifier 842 into syngas cooler 846 for further processing.

In the exemplary embodiment, when rotor 704 rotates such that pocket 712 is generally aligned with low-pressure outlet port 726, dust 820 is discharged from pocket 712, at pressure $P_{LO(7)}$, into dust filter 812. Pocket 712 is then depressurized from pressure $P_{HO(7)}$ to pressure $P_{LO(7)}$, and system 800 continues to operate as described herein with rotor 704 rotating such that pocket 712 rotates from being generally aligned with low-pressure outlet port 726 to being generally aligned with low-pressure inlet port 720.

The above-described methods and apparatus enable solid particulate to be transported within a gasifier system such that a pressure of the solid particulate is facilitated to be changed as the particulate is transported. More specifically, the rotary apparatus facilitates feeding dry, finely ground sub-bituminous coal, at the moisture content comparable to that of bituminous coal slurry, into a gasifier. As such the rotary apparatus facilitates introducing feedstock, such as, for example, coal, petroleum coke, wastes, and/or biomasses, either in dry or wet form, and also in lump or ground form, into the gasifier. Moreover, the filtering devices included on at least some of the ports facilitate venting any coal dust entrained in high-pressure transport gas to a dust collector. As such, the above-described rotary apparatus may replace a feedstock lock hopper for continuous feeding feedstock to the gasifier and also be generally compatible with existing ancillary equipment.

Furthermore, the above-described rotary apparatus facilitates changing a pressure of slag discharged from a cooler from a high pressure to a low pressure via a depressurization port positioned between the slag receiving position and the slag discharge position of the rotor channel. The apparatus also facilitates changing a pressure of the rotor channel from a low pressure to a high pressure via a repressurization port positioned between the slag discharge position and the slag receiving position of the rotor channel. As such, while the rotor channel receives slag from the gasifier through the vertical housing port in the vertical position, slag fines are facilitated to pass through the screen at the bottom housing port to be pumped back to the syngas cooler and/or to disposal. Further, the coarse slag retained on the screen is discharged from the rotary device. As such, the above-described rotary apparatus may replace a lock hopper for continuous removal of slag from a syngas cooler and also be generally compatible with existing ancillary equipment. The above-described rotary apparatus further facilitates increasing the pressure of the feedstock from approximately atmospheric pressure to a pressure approximately equal to the pressure of an entrained-flow gasifier, and/or facilitates decreasing the pressure of slag to approximately atmospheric pressure from a pressure approximately equal to the pressure of the entrained-flow gasifier.

The above-described rotary apparatus lubricant facilitates closing a gap between the rotor and the housing such that the pressure of the feedstock and/or slag is not affected by leaks between the rotor and the housing. The lubricant further facilitates reducing a frictional force between the rotor and the housing as compared to apparatuses that do not include a lubricant. Moreover, the gap between the rotor and housing sleeve may be automatically controlled by pressure feedback control loop to facilitate preventing the development of leak channels between the rotor and the housing, such as by the methods described herein. In addition, the horizontal high-pressure inlet and outlet housing ports may be physically sealed with the above-described sealing inserts to facilitate preventing high-pressure transport gas from escaping through any low-pressure surface paths.

The above-described rotor channel geometry facilitates reducing sharp corners within the channel where solid particulates may accumulate within the channel as compared to channels having other geometries that include sharp corners. As such the geometry of the channel facilitates reducing friction between the channel surface and the solid particulate, which facilitates flow of the particulate through the channel. Further, the polishing and/or coating of the rotor channel inner surface further facilitates reducing friction forces between the channel surface and the solid particulate as compared to channels that do not include such polish and/or coating.

Exemplary embodiments of a method and apparatus for transporting solid particulates within a gasifier system are described above in detail. The method and apparatus are not limited to the specific embodiments described herein, but rather, components of the method and apparatus may be utilized independently and separately from other components described herein. For example, the rotary apparatus may also be used in combination with other solid particulate transportation systems and methods, and is not limited to practice with only the gasifier systems as described herein. Rather, the present invention can be implemented and utilized in connection with many other solid particulate transportation applications.

While the invention has been described in terms of various specific embodiments, those skilled in the art will recognize that the invention can be practiced with modification within the spirit and scope of the claims.

What is claimed is:

1. A rotary apparatus for transporting particulates, said rotary apparatus comprising:
    a housing;
    a rotor coupled within said housing;
    at least one channel extending through said rotor, said at least one channel is oriented substantially perpendicular to an axis of rotation of said rotor, said at least one channel has a first channel end and a second channel end; and
    a plurality of ports defined in said housing, said plurality of ports include at least one first pressure inlet port, at least one first-pressure outlet port, at least one second-pressure inlet port, and at least one second-pressure outlet port, said plurality of ports are oriented such that:
        when said rotor is in a first position, said first channel end is aligned with said at least one first-pressure inlet port and said second channel end is substantially sealed by said housing;
        when said rotor is in a second position, said first channel end is aligned with said at least one second-pressure outlet port and said second channel end is aligned with said at least one second-pressure inlet port; and
        when said rotor is in a third position, said first channel end is aligned with said at least one first-pressure outlet port and said second channel end is substantially sealed by said housing.

2. A rotary apparatus in accordance with claim 1 wherein said at least one first-pressure inlet port is configured for coupling to a feedstock source.

3. A rotary apparatus in accordance with claim 1 wherein said at least one second-pressure inlet port is configured for coupling to a high-pressure source.

4. A rotary apparatus in accordance with claim 3 wherein said at least one second-pressure inlet port is configured to receive a high-pressure gas from the high-pressure source.

5. A rotary apparatus in accordance with claim 1 wherein said at least one first-pressure outlet port comprises a filter device.

6. A rotary apparatus in accordance with claim 5 wherein said filter device is configured to permit isolation and cleaning of at least a portion of said filter device while said rotary apparatus is in operation.

7. A rotary apparatus in accordance with claim 1 further comprising a lubricant applied to at least one of an inner surface of said housing and an outer surface of said rotor.

8. A rotary apparatus in accordance with claim 1 wherein a radius of said rotor decreases uniformly along an axial length of said rotor and an inner surface of said housing is correspondingly tapered to form a uniform gap between said rotor and said housing inner surface, a relative axial position of said rotor within said housing is adjustable to adjust the gap.

9. A rotary apparatus for transporting particulates, said rotary apparatus comprising:
    a housing;
    a rotor coupled within said housing;
    at least one pocket defined within an outer surface of said rotor; and
    a plurality of ports defined in said housing, said plurality of ports include at least one first-pressure inlet port, at least one first-pressure outlet port, at least one second-pressure inlet port, and at least one second-pressure outlet port, said plurality of ports are oriented such that:
        when said rotor is in a first position, said at least one pocket is aligned with said at least one first-pressure inlet port;
        when said rotor is in a second position, said at least one pocket is aligned with said at least one second-pressure inlet port;
        when said rotor is in a third position, said at least one pocket is aligned with said at least one second-pressure outlet port; and
        when said rotor is in a fourth position, said at least one pocket is aligned with said at least one first-pressure outlet port; wherein said at least one pocket is operable to receive particulates in only one position or to discharge particulates in only one position.

10. A rotary apparatus in accordance with claim 9 wherein said at least one pocket comprises a first pocket spaced along said rotor outer surface from a second pocket such that said first pocket is opposed to said second pocket.

11. A rotary apparatus in accordance with claim 9 wherein said at least one first-pressure inlet port is oriented to oppose said at least one second-pressure outlet port, and said at least one second-pressure inlet port is oriented to oppose said at least one first-pressure outlet port.

* * * * *